United States Patent
Saggu

(10) Patent No.: US 11,922,703 B1
(45) Date of Patent: Mar. 5, 2024

(54) GENERIC OBSTACLE DETECTION IN DRIVABLE AREA

(71) Applicant: PlusAI, Inc., Santa Clara, CA (US)

(72) Inventor: Inderjot Singh Saggu, Cupertino, CA (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

(21) Appl. No.: 18/131,861

(22) Filed: Apr. 6, 2023

(51) Int. Cl.
   *G06V 20/58* (2022.01)
   *B60W 60/00* (2020.01)
   *G06V 10/26* (2022.01)
   *G06V 10/774* (2022.01)
   *G06V 20/56* (2022.01)

(52) U.S. Cl.
   CPC ........... *G06V 20/58* (2022.01); *B60W 60/001* (2020.02); *G06V 10/267* (2022.01); *G06V 10/273* (2022.01); *G06V 10/774* (2022.01); *G06V 20/588* (2022.01); *B60W 2420/42* (2013.01)

(58) Field of Classification Search
   CPC .... G06V 20/58; G06V 10/267; G06V 10/273; G06V 10/774; G06V 20/588; B60W 60/001; B60W 2420/42
   See application file for complete search history.

(56) References Cited

U.S. PATENT DOCUMENTS

| | | | |
|---|---|---|---|
| 2019/0156131 A1* | 5/2019 | Akiyama | G06T 7/00 |
| 2019/0187720 A1* | 6/2019 | Fowe | G06N 20/00 |
| 2021/0309248 A1* | 10/2021 | Choe | B60W 50/06 |
| 2022/0057806 A1* | 2/2022 | Guo | G06V 20/58 |
| 2022/0230321 A1* | 7/2022 | Zhao | G06T 5/004 |

* cited by examiner

*Primary Examiner* — Kenneth J Malkowski
(74) *Attorney, Agent, or Firm* — Morgan, Lewis & Bockius LLP

(57) ABSTRACT

This application is directed to generic obstacle detection for at least partially autonomous vehicle driving. A first vehicle obtains a road image. The road image includes a road surface along which the first vehicle is travelling. The first vehicle identifies one or more identifiable objects on the road surface in the road image. The first vehicle detects a plurality of objects on the road surface in the road image. The first vehicle eliminates the one or more identifiable objects from the plurality of objects in the road image to determine one or more unidentifiable objects on the road surface in the road image. The first vehicle at least partially autonomously drives the first vehicle by treating the one or more unidentifiable objects differently from the one or more identifiable objects.

20 Claims, 16 Drawing Sheets

GENERIC OBSTACLE DETECTION IN DRIVABLE AREA

TECHNICAL FIELD

The present application generally relates to vehicle technology, and more particularly to, computer-aided methods and systems for detecting generic obstacles on a road surface to facilitate autonomous vehicle control and/or planning.

BACKGROUND

Vehicles are now capable of self-driving with different levels of autonomy. Each of these levels is characterized by the relative amount of human and autonomous control. For example, The Society of Automotive Engineers (SAE) defines 6 levels of driving automation ranging from 0 (fully manual) to 5 (fully autonomous). These levels have been adopted by the U.S. Department of Transportation. Autonomous vehicles provide numerous advantages including: (1) lowering the number of vehicles on the roads, (2) more predictable and safer driving behavior than human driven vehicles, (3) less emissions if there are fewer vehicles on the road, and if they are electrically powered, (4) improved travel efficiency, fuel economy, and traffic safety if they are controlled by computers, (5) increased lane capacity, (6) shorter travel times, and (7) increased mobility for users who are incapable of diving.

There are numerous advantages of autonomous vehicles, including: (1) lowering the number of vehicles on the roads (most privately owned vehicles are driven a small fraction of the time); (2) more predictable and safer driving behavior than human driven vehicles; (3) less emissions if more vehicles are electrically powered; (4) improved fuel efficiency; (5) increased lane capacity; (6) shorter travel times; and (7) mobility for users who are incapable of diving. One of the key obstacles facing the autonomous vehicle industry, however, is the complexity of detecting (e.g., obstacles) on a road surface. A typical object detection model is trained to detect objects that belong to a predefined set of (e.g., known) classes, such as vehicles and lane lines. The object detection model often fails to detect an object that does not belong to any of these predefined set of classes, identifies an incorrect class to which the object belongs, or generates a bounding box that does not match the object on the road surface.

A conventional approach for detecting new objects that do not belong to any existing classes is to add a new class (e.g., mattress, box, tree branch, dead animal, etc.) to the object detection model for every new object that does not belong to an existing class, collect as much data as possible for each new class that is added, label the data, and use the labeled data as training data to train the object detection model to detect the new classes. However, manual annotation (e.g., adding bounding boxes) of each object is costly and time-consuming, and it is impractical (and impossible) to collect data on every object on the road. The conventional approach may not work when the model encounters an object that is not part of the training. It is desirable to develop a more efficient and robust approach for detecting new objects that do not belong to any existing classes to facilitate autonomous vehicle control and/or planning.

SUMMARY

This application is directed to methods, systems, and non-transitory computer readable storage media for generic obstacle detection using deep learning techniques. According to some aspects of the present disclosure, the generic obstacle detection problem can be re-framed as an occupied/occluded drivable area detection problem, whereby instead of training a model to detect what a generic obstacle is, the model learns what is (and is not) on a road surface. A generic object or obstacle broadly refers to an object on a road surface, independently of whether the object is categorized into a specified class of identifiable objects (e.g., any predefined existing or known object classes). The advantages of framing the problem this way include: (1) the resultant model is agnostic to object type; what matters is whether the object is on a road surface or not; and (2) the resultant model analyzes only objects that are occluding (e.g., occupying) the road surface, but not other objects that are not on the road surface (e.g., trees at the side of the road).

In one aspect, a method for generic obstacle detection is implemented at a first vehicle including one or more processors and memory. The method includes obtaining a road image including a road surface along which the first vehicle is travelling. The method includes identifying one or more identifiable objects on the road surface in the road image. The method includes detecting a plurality of objects on the road surface in the road image. The method includes eliminating the one or more identifiable objects from the plurality of objects in the road image to determine one or more unidentifiable objects on the road surface in the road image. The method also includes at least partially autonomously driving the first vehicle by treating the one or more unidentifiable objects differently from the one or more identifiable objects.

In some embodiments, the method includes retraining, using machine learning, a drivable area model using a corpus of training images to generate a generic obstacle detection model. The drivable area model is configured to detect a drivable area within road images. The method includes distributing the generic obstacle detection model to one or more vehicles, including the first vehicle. When in use, the generic obstacle detection model is applied to detect the plurality of objects on the road surface in the road image.

In some embodiments, the method includes obtaining a first set of images. Each of the first set of images includes a respective unoccluded road surface (e.g., without any identifiable obstacles). The method includes placing, in each image of the first set of images, one or more respective obstacle images onto the respective unconcluded road surface of the image to create a plurality of synthetic training images. The method includes adding the plurality of synthetic training images to the corpus of training images.

According to another aspect of the present application, a first vehicle includes one or more processing units and memory having a plurality of programs stored in the memory. The programs, when executed by the one or more processing units, cause the first vehicle to perform any of the methods for generic obstacle detection as disclosed herein.

According to another aspect of the present application, a non-transitory computer readable storage medium stores a plurality of programs configured for execution by a first vehicle having one or more processing units. The programs, when executed by the one or more processing units, cause the first vehicle to perform any of the methods for generic obstacle detection as disclosed herein.

BRIEF DESCRIPTION OF DRAWINGS

The accompanying drawings, which are included to provide a further understanding of the embodiments, are incorporated herein, constitute a part of the specification, illustrate the described embodiments, and, together with the description, serve to explain the underlying principles.

Like reference numerals refer to corresponding parts throughout the several views of the drawings.

DETAILED DESCRIPTION

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of the claims and the subject matter may be practiced without these specific details. For example, it will be apparent to one of ordinary skill in the art that the subject matter presented herein can be implemented on many types of electronic devices with digital video capabilities.

Various embodiments of this application are directed to generic obstacle detection. A generic object or obstacle broadly refers to an object detected on a road surface, regardless of whether the object is categorized into a specified class of identifiable objects (e.g., any predefined existing or known object classes). In some embodiments, a first vehicle obtains a road image including a road surface along which the first vehicle is travelling. In some embodiments, the first vehicle includes one or more cameras for obtaining the road image. In some embodiments, the first vehicle identifies one or more identifiable objects on the road surface in the road image and detects a plurality of objects on the road surface in the road image. In some embodiments, an object detection model is applied to identify the one or more identifiable objects and generate one or more bounding boxes around the one or more identifiable objects. In some embodiments, a generic obstacle detection model is distinct from the object detection model, and applied to detect the plurality of objects, e.g., on the road image. In some embodiments, the first vehicle eliminates the one or more identifiable objects from the plurality of objects in the road image to determine one or more unidentifiable objects on the road surface in the road image. In some embodiments, the first vehicle is at least partially autonomously driven by treating the one or more unidentifiable objects differently from the one or more identifiable objects.

Figure 1:
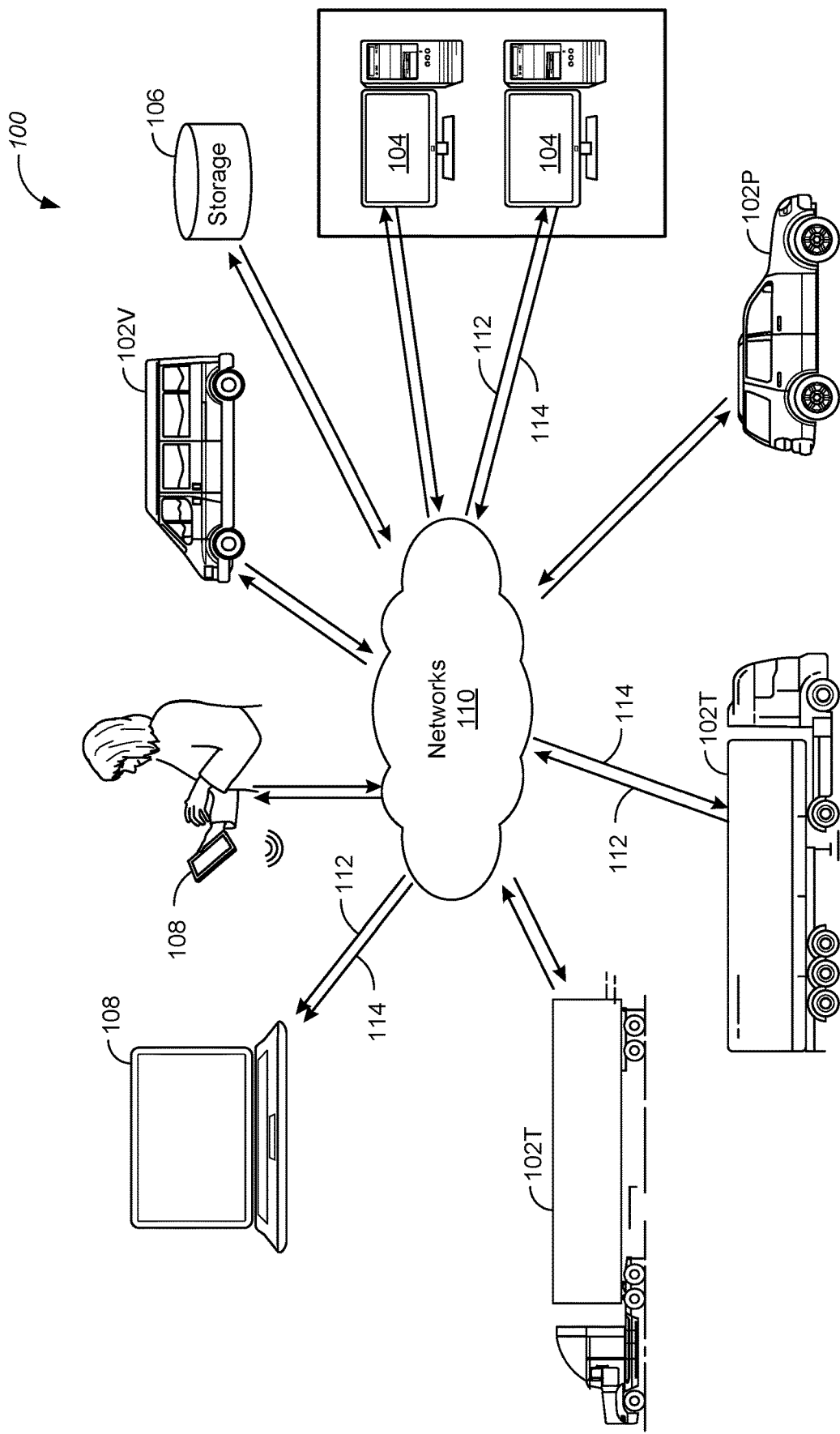
FIG. 1 is an example vehicle driving environment for a plurality of vehicles, in accordance with some embodiments.

FIG. 1 is an example vehicle driving environment 100 having a plurality of vehicles 102 (e.g., vehicles 102P, 102T, and 102V), in accordance with some embodiments. Each vehicle 102 has one or more processors, memory, a plurality of sensors, and a vehicle control system. The vehicle control system is configured to sense the vehicle driving environment 100 and drive on roads having different road conditions. The plurality of vehicles 102 may include passenger cars 102P (e.g., sport-utility vehicles and sedans), vans 102V, trucks 102T, and driver-less cars. Each vehicle 102 can collect sensor data and/or user inputs, execute user applications, present outputs on its user interface, and/or operate the vehicle control system to drive the vehicle 102. The collected data or user inputs can be processed locally (e.g., for training and/or for prediction) at the vehicle 102 and/or remotely by one or more servers 104. The one or more servers 104 provide system data (e.g., boot files, operating system images, and user applications) to the vehicle 102, and in some embodiments, process the data and user inputs received from the vehicle 102 when the user applications are executed on the vehicle 102. In some embodiments, the vehicle driving environment 100 further includes storage 106 for storing data related to the vehicles 102, servers 104, and applications executed on the vehicles 102.

For each vehicle 102, the plurality of sensors includes one or more of: (1) a global positioning system (GPS) sensors; (2) a light detection and ranging (LiDAR) scanner; (3) one or more cameras; (4) a radio detection and ranging (RADAR) sensor; (5) an infrared sensor; (6) one or more ultrasonic sensors; (7) a dedicated short-range communication (DSRC) module; (8) an inertial navigation system (INS) including accelerometers and gyroscopes; and/or (9) an odometry sensor. In some embodiments, a vehicle 102 includes a 5G communication module to facilitate vehicle communication jointly with or in place of the DSRC module. The cameras are configured to capture a plurality of images in the vehicle driving environment 100, and the plurality of images are applied to map the vehicle driving environment 100 to a 3D vehicle space and identify a location of the vehicle 102 within the environment 100. The cameras also operate with one or more other sensors (e.g., GPS, LiDAR, RADAR, and/or INS) to localize the vehicle 102 in the 3D vehicle space. For example, the GPS identifies a geographical position (geolocation) of the vehicle 102 on the Earth, and the INS measures relative vehicle speeds and accelerations between the vehicle 102 and adjacent vehicles 102. The LiDAR scanner measures the distance between the vehicle 102 and adjacent vehicles 102 and other objects. Data collected by these sensors is used to determine vehicle locations determined from the plurality of images or to facilitate determining vehicle locations between two images.

The vehicle control system includes a plurality of actuators for at least steering, braking, controlling the throttle (e.g., accelerating, maintaining a constant velocity, or decelerating), and transmission control. Depending on the level of automation, each of the plurality of actuators (or manually controlling the vehicle, such as by turning the steering wheel) can be controlled manually by a driver of the vehicle, automatically by the one or more processors of the vehicle, or jointly by the driver and the processors. When the vehicle 102 controls the plurality of actuators independently or jointly with the driver, the vehicle 102 obtains the sensor data collected by the plurality of sensors, identifies adjacent road features in the vehicle driving environment 100, tracks the motion of the vehicle, tracks the relative distance between the vehicle and any surrounding vehicles or other objects, and generates vehicle control instructions to at least partially autonomously control driving of the vehicle 102. Conversely, in some embodiments, when the driver takes control of the vehicle, the driver manually provides vehicle control instructions via a steering wheel, a braking pedal, a throttle pedal, and/or a gear lever directly. In some embodiments, a vehicle user application is executed on the vehicle and configured to provide a user interface. The driver provides vehicle control instructions to control the plurality of actuators of the vehicle control system via the user interface of the vehicle user application. By these means, the vehicle 102 is configured to drive with its own vehicle control system and/or the driver of the vehicle 102 according to the level of autonomy.

In some embodiments, autonomous vehicles include, for example, a fully autonomous vehicle, a partially autonomous vehicle, a vehicle with driver assistance, or an autonomous capable vehicle. Capabilities of autonomous vehicles can be associated with a classification system, or taxonomy, having tiered levels of autonomy. A classification system can be specified, for example, by industry standards or governmental guidelines. For example, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention) as classified by the International Society of Automotive Engineers (SAE International). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. As used herein, the term "driver" may refer to a local operator or a remote operator. The autonomous vehicle may operate solely at a given level (e.g. level 2 additional assistance or level 5 full automation) for at least a period of time or during the entire operating time of the autonomous vehicle. Other classification systems can provide other levels of autonomy characterized by different vehicle capabilities.

In some embodiments, the vehicle 102 drives in the vehicle driving environment 100 at level 5. The vehicle 102 collects sensor data from the plurality of sensors, processes the sensor data to generate vehicle control instructions, and controls the vehicle control system to drive the vehicle autonomously in response to the vehicle control instructions. Alternatively, in some situations, the vehicle 102 drives in the vehicle driving environment 100 at level 0. The vehicle 102 collects the sensor data and processes the sensor data to provide feedback (e.g., a warning or an alert) to a driver of the vehicle 102 to allow the driver to drive the vehicle 102 manually and based on the driver's own judgement. Alternatively, in some situations, the vehicle 102 drives in the vehicle driving environment 100 partially autonomously at one of levels 1-4. The vehicle 102 collects the sensor data and processes the sensor data to generate a vehicle control instruction for a portion of the vehicle control system and/or provide feedback to a driver of the vehicle 102. The vehicle 102 is driven jointly by the vehicle control system of the vehicle 102 and the driver of the vehicle 102. In some embodiments, the vehicle control system and driver of the vehicle 102 control different portions of the vehicle 102. In some embodiments, the vehicle 102 determines the vehicle status. Based on the vehicle status, a vehicle control instruction of one of the vehicle control system or driver of the vehicle 102 preempts or overrides another vehicle control instruction provided by the other one of the vehicle control system or driver of the vehicle 102.

For the vehicle 102, the sensor data collected by the plurality of sensors, the vehicle control instructions applied to the vehicle control system, and the user inputs received via the vehicle user application form a collection of vehicle data 112. In some embodiments, at least a subset of the vehicle data 112 from each vehicle 102 is provided to one or more servers 104. A server 104 provides a central vehicle platform for collecting and analyzing the vehicle data 112, monitoring vehicle operation, detecting faults, providing driving solutions, and updating additional vehicle information 114 to individual vehicles 102 or client devices 108. In some embodiments, the server 104 manages vehicle data 112 of each individual vehicle 102 separately. In some embodiments, the server 104 consolidates vehicle data 112 from multiple vehicles 102 and manages the consolidated vehicle data jointly (e.g., the server 104 statistically aggregates the data).

Additionally, in some embodiments, the vehicle driving environment 100 further includes one or more client devices 108, such as desktop computers, laptop computers, tablet computers, and mobile phones. Each client device 108 is configured to execute a client user application associated with the central vehicle platform provided by the server 104. The client device 108 is logged into a user account on the client user application, and the user account is associated with one or more vehicles 102. The server 104 provides the collected vehicle data 112 and additional vehicle information 114 (e.g., vehicle operation information, fault information, or driving solution information) for the one or more associated vehicles 102 to the client device 108 using the user account of the client user application. In some embodiments, the client device 108 is located in the one or more vehicles 102, while in other embodiments, the client device is at a location distinct from the one or more associated vehicles 102. As such, the server 104 can apply its computational capability to manage the vehicle data 112 and facilitate vehicle monitoring and control on different levels (e.g., for each individual vehicle, for a collection of vehicles, and/or for related client devices 108).

The plurality of vehicles 102, the one or more servers 104, and the one or more client devices 108 are communicatively coupled to each other via one or more communication networks 110, which is used to provide communications links between these vehicles and computers connected together within the vehicle driving environment 100. The one or more communication networks 110 may include connections, such as a wired network, wireless communication links, or fiber optic cables. Examples of the one or more communication networks 110 include local area networks (LAN), wide area networks (WAN) such as the Internet, or a combination thereof. The one or more communication networks 110 are, in some embodiments, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol. A connection to the one or more communication networks 110 may be established either directly (e.g., using 3G/4G/5G connectivity to a wireless carrier), or through a network interface (e.g., a router, a switch, a gateway, a hub, or an intelligent, dedicated whole-home control node), or through any combination thereof. In some embodiments, the one or more communication networks 110 allow for communication using any suitable protocols, like Transmission Control Protocol/Internet Protocol (TCP/IP). In some embodiments, each vehicle 102 is communicatively coupled to the servers 104 via a cellular communication network.

In some embodiments, deep learning techniques are applied by the vehicles 102, the servers 104, or both, to process the vehicle data 112. For example, in some embodiments, after image data is collected by the cameras of one of the vehicles 102, the image data is processed using an object detection model to identify objects (e.g., road features including, but not limited to, vehicles, lane lines, shoulder lines, road dividers, traffic lights, traffic signs, road signs, cones, pedestrians, bicycles, and drivers of the vehicles) in the vehicle driving environment 100. In some embodiments, additional sensor data is collected and processed by a vehicle control model to generate a vehicle control instruction for controlling the vehicle control system. In some embodiments, a vehicle planning model is applied to plan a driving control process based on the collected sensor data and the vehicle driving environment 100. The object detection model, vehicle control model, and vehicle planning model are collectively referred to herein as vehicle data processing models (i.e., machine learning models 250 in FIG. 2), each of which includes one or more neural networks. In some embodiments, such a vehicle data processing model is applied by the vehicles 102, the servers 104, or both, to process the vehicle data 112 to infer associated vehicle status and/or provide control signals. In some embodiments, a vehicle data processing model is trained by a server 104, and applied locally or provided to one or more vehicles 102 for inference of the associated vehicle status and/or to provide control signals. Alternatively, a vehicle data processing model is trained locally by a vehicle 102, and applied locally or shared with one or more other vehicles 102 (e.g., by way of the server 104). In some embodiments, a vehicle data processing model is trained in a supervised, semi-supervised, or unsupervised manner.

Figure 2:
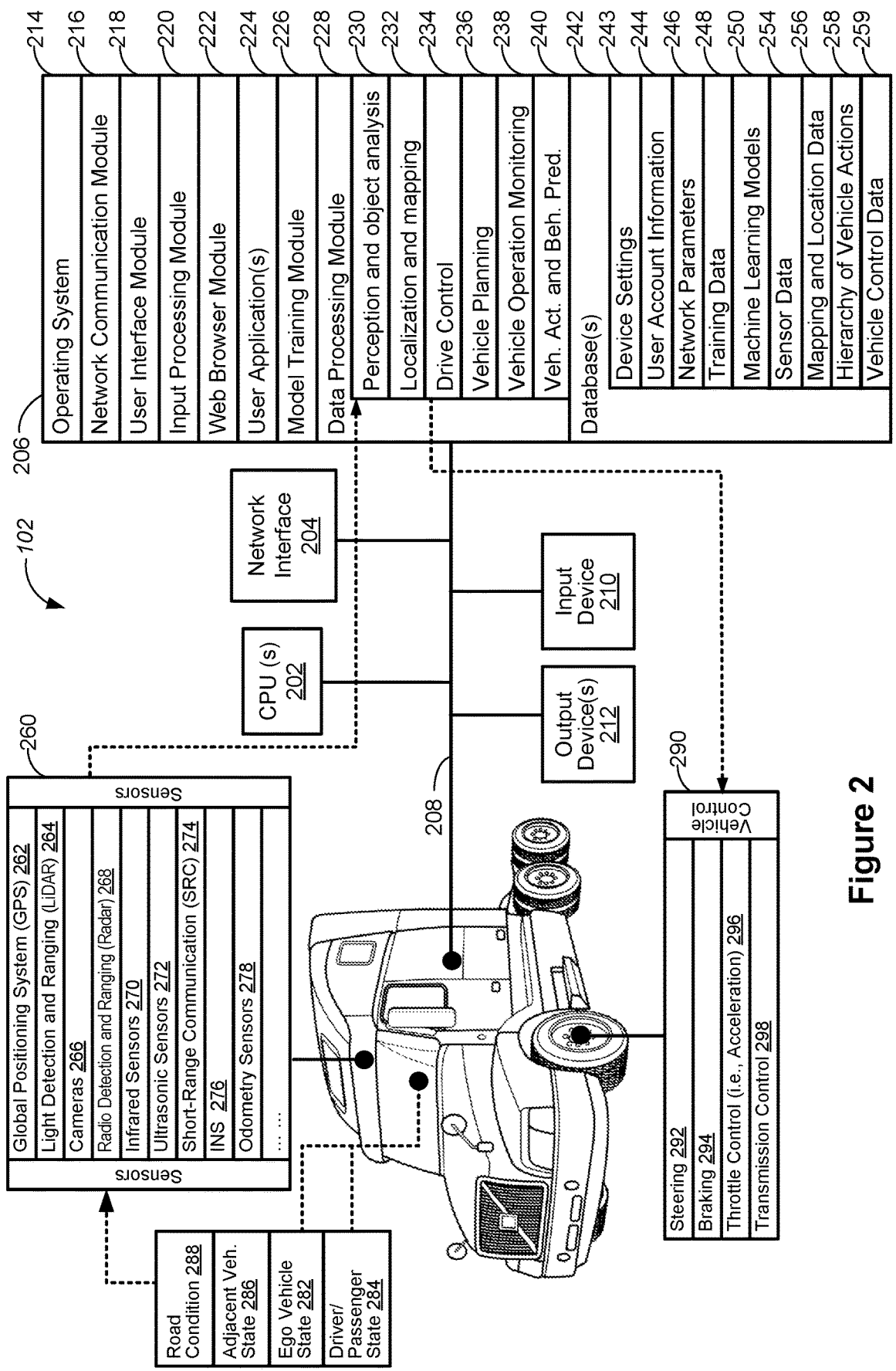
FIG. 2 is a block diagram of an example vehicle configured to be driven with a certain level of autonomy, in accordance with some embodiments.

FIG. 2 is a block diagram of an example vehicle 102 configured to be driven with a certain level of autonomy, in accordance with some embodiments. The vehicle 102 typically includes one or more processing units (CPUs) 202, one or more network interfaces 204, memory 206, and one or more communication buses 208 for interconnecting these components (sometimes called a chipset). The vehicle 102 includes one or more user interface devices. The user interface devices include one or more input devices 210, which facilitate user input, such as a keyboard, a mouse, a voice-command input unit or microphone, a touch screen display, a touch-sensitive input pad, a gesture capturing camera, or other input buttons or controls. Furthermore, in some embodiments, the vehicle 102 uses a microphone and voice recognition or a camera and gesture recognition to supplement or replace the keyboard. In some embodiments, the one or more input devices 210 include one or more cameras, scanners, or photo sensor units for capturing images, for example, of a driver and a passenger in the vehicle 102. The vehicle 102 also includes one or more output devices 212, which enable presentation of user interfaces and display content, including one or more speakers and/or one or more visual displays (e.g., a display panel located near to a driver's right hand in right-hand-side operated vehicles typical in the U.S.).

The vehicle 102 includes a plurality of sensors 260 configured to collect sensor data in a vehicle driving environment 100. The plurality of sensors 260 include one or more of a GPS 262, a LiDAR scanner 264, one or more cameras 266, a RADAR sensor 268, an infrared sensor 270, one or more ultrasonic sensors 272, an SRC module 274, an INS 276 including accelerometers and gyroscopes, and an odometry sensor 278. The GPS 262 localizes the vehicle 102 in Earth coordinates (e.g., using a latitude value and a longitude value) and can reach a first accuracy level less than 1 meter (e.g., 30 cm). The LiDAR scanner 264 uses light beams to estimate relative distances between the scanner 264 and a target object (e.g., another vehicle 102), and can reach a second accuracy level better than the first accuracy level of the GPS 262. The cameras 266 are installed at different locations on the vehicle 102 to monitor surroundings of the camera 266 from different perspectives. In some situations, a camera 266 is installed facing the interior of the vehicle 102 and configured to monitor the state of the driver of the vehicle 102. The RADAR sensor 268 emits electromagnetic waves and collects reflected waves to determine the speed and a distance of an object over which the waves are reflected. The infrared sensor 270 identifies and tracks objects in an infrared domain when lighting conditions are poor. The one or more ultrasonic sensors 272 are used to detect objects at a short distance (e.g., to assist parking). The SRC module 274 is used to exchange information with a road feature (e.g., a traffic light). The INS 276 uses the accelerometers and gyroscopes to measure the position, the orientation, and the speed of the vehicle. The odometry sensor 278 tracks the distance the vehicle 102 has travelled, (e.g., based on a wheel speed). In some embodiments, based on the sensor data collected by the plurality of sensors 260, the one or more processors 202 of the vehicle monitor its own vehicle state 282, the driver or passenger state 284, states of adjacent vehicles 286, and road conditions 288 associated with a plurality of road features.

The vehicle 102 has a control system 290, including a steering control 292, a braking control 294, a throttle control 296, a transmission control 298, signaling and lighting controls, and other controls. In some embodiments, one or more actuators of the vehicle control system 290 are automatically controlled based on the sensor data collected by the plurality of sensors 260 (e.g., according to one or more of the vehicle state 282, the driver or passenger state 284, states of adjacent vehicles 286, and/or road conditions 288).

The memory 206 includes high-speed random access memory, such as DRAM, SRAM, DDR RAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. In some embodiments, the memory 206 includes one or more storage devices remotely located from one or more processing units 202. The memory 206, or alternatively the non-volatile the memory within the memory 206, includes a non-transitory computer readable storage medium. In some embodiments, the memory 206, or the non-transitory computer readable storage medium of the memory 206, stores the following programs, modules, and data structures, or a subset or superset thereof:

- an operating system 214, which includes procedures for handling various basic system services and for performing hardware dependent tasks;
- a network communication module 216, which connects each vehicle 102 to other devices (e.g., another vehicle 102, a server 104, or a client device 108) via one or more network interfaces (wired or wireless) and one or more communication networks 110, such as the Internet, other wide area networks, local area networks, metropolitan area networks, and so on;
- a user interface module 218, which enables presentation of information (e.g., a graphical user interface for an application 224, widgets, websites and web pages thereof, audio content, and/or video content) at the vehicle 102 via one or more output devices 212 (e.g., displays or speakers);
- an input processing module 220, which detects one or more user inputs or interactions from one of the one or more input devices 210 and interprets the detected input or interaction;
- a web browser module 222, which navigates, requests (e.g., via HTTP), and displays websites and web pages thereof, including a web interface for logging into a user account of a user application 224 associated with the vehicle 102 or another vehicle;
- one or more user applications 224, which are executed at the vehicle 102. The user applications 224 include a vehicle user application that controls the vehicle 102 and enables users to edit and review settings and data associated with the vehicle 102;
- a model training module 226, which trains a machine learning model 250. The model 250 includes at least one neural network and is applied to process vehicle data (e.g., sensor data and vehicle control data) of the vehicle 102;
- a data processing module 228, which performs a plurality of on-vehicle tasks, including, but not limited to, perception and object analysis 230, vehicle localization and environment mapping 232, vehicle drive control 234, vehicle drive planning 236, local operation monitoring 238, and vehicle action and behavior prediction 240;
- a vehicle database 242, which stores vehicle data 112, including:
  - device settings 243, including common device settings (e.g., service tier, device model, storage capacity, processing capabilities, communication capabilities, and/or medical procedure settings) of the vehicle 102;
  - user account information 244 for the one or more user applications 224 (e.g., user names, security questions, account history data, user preferences, and predefined account settings);
  - network parameters 246 for the one or more communication networks 110, (e.g., IP address, subnet mask, default gateway, DNS server, and host name);
  - training data 248 for training the machine learning model 250;
  - machine learning models 250 for processing vehicle data 112, where in some embodiments, the machine learning model 250 is applied to process one or more images captured by a first vehicle 102A and predict a sequence of vehicle actions of a second vehicle through a hierarchy of interconnected vehicle actions;
  - sensor data 254 captured or measured by the plurality of sensors 260;
  - mapping and location data 256, which is determined from the sensor data 254 to map the vehicle driving environment 100 and locations of the vehicle 102 in the environment 100;
  - a hierarchy of interconnected vehicle actions 258 including a plurality of predefined vehicle actions that are organized to define a plurality of vehicle action sequences; and
  - vehicle control data 259, which is automatically generated by the vehicle 102 or manually input by the user via the vehicle control system 290 based on predicted vehicle actions to drive the vehicle 102.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory 206 stores a subset of the modules and data structures identified above. In some embodiments, the memory 206 stores additional modules and data structures not described above.

Figure 3:
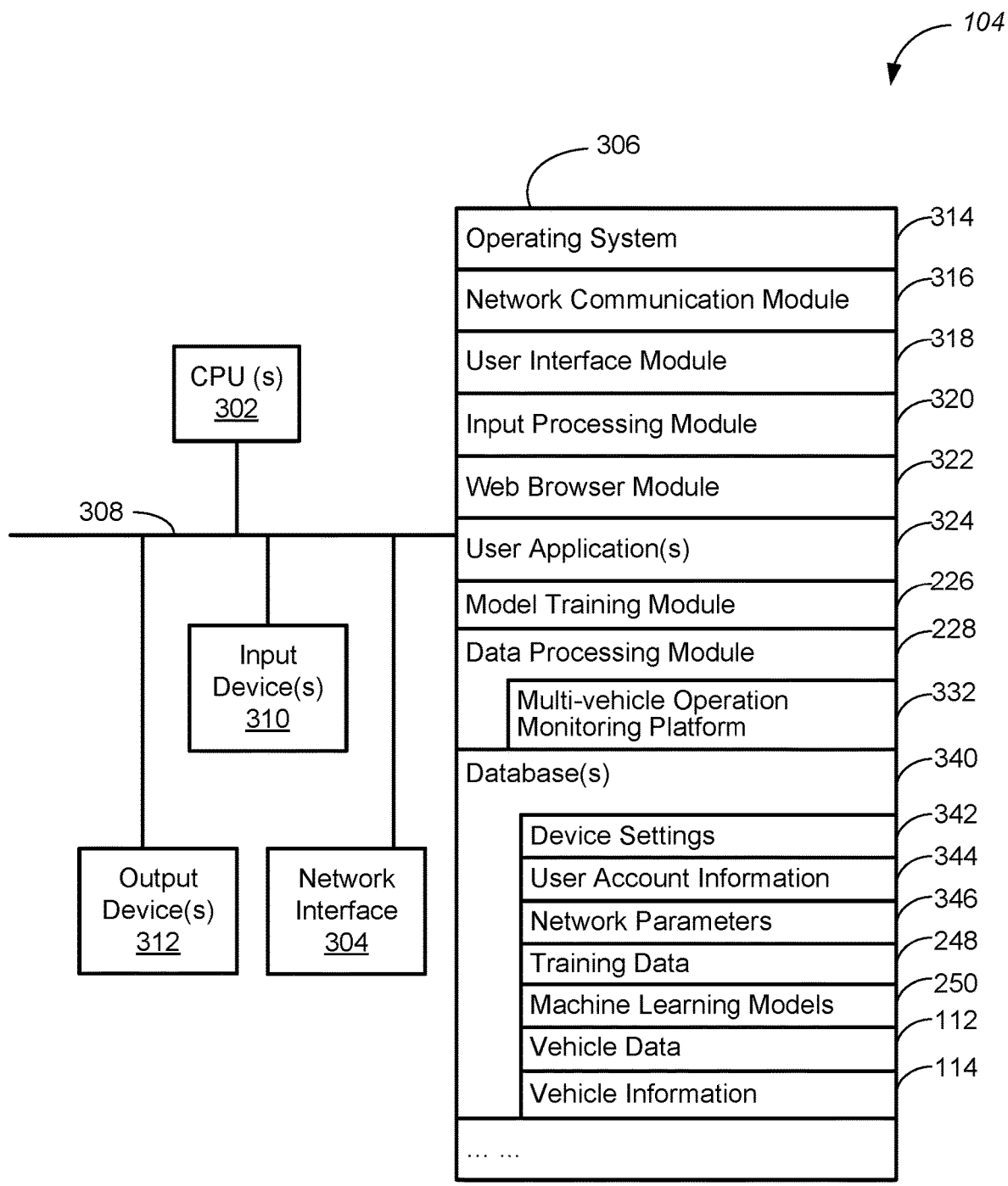
FIG. 3 is a block diagram of an example server for monitoring and managing vehicles in a vehicle driving environment, in accordance with some embodiments.

FIG. 3 is a block diagram of a server 104 for monitoring and managing vehicles 102 in a vehicle driving environment (e.g., the environment 100 in FIG. 1), in accordance with some embodiments. Examples of the server 104 include, but are not limited to, a server computer, a desktop computer, a laptop computer, a tablet computer, or a mobile phone. The server 104 typically includes one or more processing units (CPUs) 302, one or more network interfaces 304, memory 306, and one or more communication buses 308 for interconnecting these components (sometimes called a chipset). The server 104 includes one or more user interface devices. The user interface devices include one or more input devices 310, which facilitate user input, such as a keyboard, a mouse, a voice-command input unit or microphone, a touch screen display, a touch-sensitive input pad, a gesture capturing camera, or other input buttons or controls. Furthermore, in some embodiments, the server 104 uses a microphone and voice recognition or a camera and gesture recognition to supplement or replace the keyboard. In some embodiments, the one or more input devices 310 include one or more cameras, scanners, or photo sensor units for capturing images, for example, of graphic serial codes printed on electronic devices. The server 104 also includes one or more output devices 312, which enable presentation of user interfaces and display content, including one or more speakers and/or one or more visual displays.

The memory 306 includes high-speed random access memory, such as DRAM, SRAM, DDR RAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. In some embodiments, the memory 306 includes one or more storage devices remotely located from one or more processing units 302. The memory 306, or alternatively the non-volatile memory within memory 306, includes a non-transitory computer readable storage medium. In some embodiments, the memory 306, or the non-transitory computer readable storage medium of the memory 306, stores the following programs, modules, and data structures, or a subset or superset thereof:

- an operating system 314, which includes procedures for handling various basic system services and for performing hardware dependent tasks;
- a network communication module 316, which connects the server 104 to other devices (e.g., vehicles 102, another server 104, and/or client devices 108) via one or more network interfaces (wired or wireless) and one or more communication networks 110, such as the Internet, other wide area networks, local area networks, metropolitan area networks, and so on;
- a user interface module 318, which enables presentation of information (e.g., a graphical user interface for user application 324, widgets, websites and web pages thereof, audio content, and/or video content) at the vehicle 102 via one or more output devices 312 (e.g., displays or speakers);
- an input processing module 320, which detects one or more user inputs or interactions from one of the one or more input devices 310 and interprets the detected input or interaction;
- a web browser module 322, which navigates, requests (e.g., via HTTP), and displays websites and web pages thereof, including a web interface for logging into a user account of a user application 324;
- one or more user applications 324, which are executed at the server 104. The user applications 324 include a vehicle user application that associates vehicles 102 with user accounts and facilitates controlling the vehicles 102, and enables users to edit and review settings and data associated with the vehicles 102;
- a model training module 226, which trains a machine learning model 250, where the model 250 includes at least one neural network and is applied to process vehicle data (e.g., sensor data and vehicle control data) of one or more vehicles 102;
- a data processing module 228, which manages a multi-vehicle operation monitoring platform 332 configured to collect vehicle data 112 from a plurality of vehicles 102, monitor vehicle operation, detect faults, provide driving solutions, and update additional vehicle information 114 to individual vehicles 102 or client devices 108. The data processing module 228 manages vehicle data 112 for each individual vehicle 102 separately or processes vehicle data 112 of multiple vehicles 102 jointly (e.g., statistically, in the aggregate);
- vehicle server data 340, including:
  - device settings 342, which include common device settings (e.g., service tier, device model, storage capacity, processing capabilities, communication capabilities, and/or medical procedure settings) of the server 104;
  - user account information 344 for the one or more user applications 324 (e.g., user names, security questions, account history data, user preferences, and predefined account settings);
  - network parameters 346 for the one or more communication networks 110, (e.g., IP address, subnet mask, default gateway, DNS server, and host name);
  - training data 248 for training the machine learning model 250;
  - machine learning models 250 for processing vehicle data;
  - vehicle data 112, which is collected from a plurality of vehicles 102 and includes sensor data 254, mapping and location data 256, and vehicle control data 259; and
  - additional vehicle information 114, including vehicle operation information, fault information, and/or driving solution information, which are generated from the collected vehicle data 112.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory 306 stores a subset of the modules and data structures identified above. In some embodiments, the memory 306 stores additional modules and data structures not described above.

Figure 4:
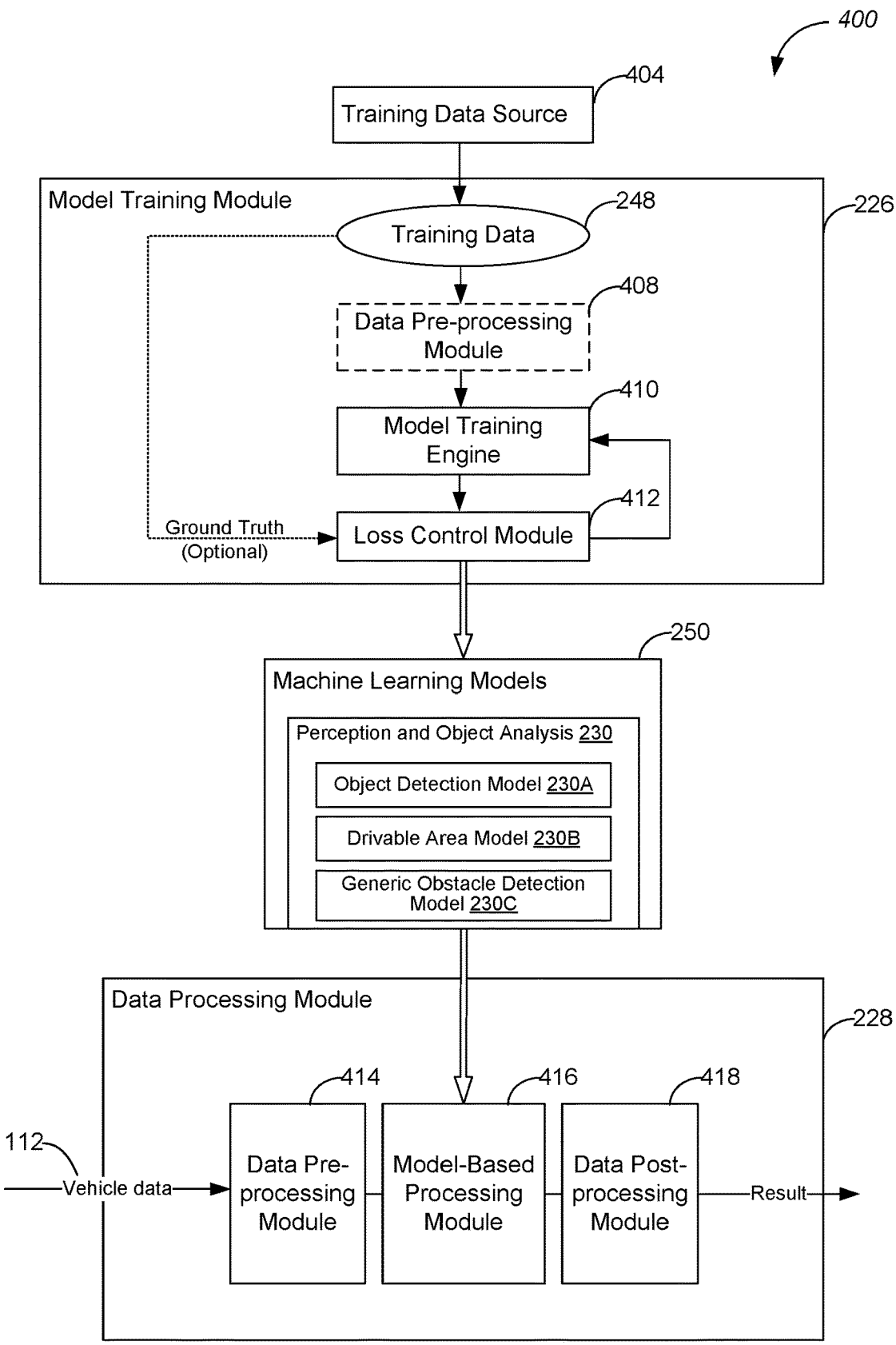
FIG. 4 is a block diagram of a machine learning system for training and applying vehicle data processing models for facilitating at least partial autonomous driving of a vehicle, in accordance with some embodiments.
Figure 5A:
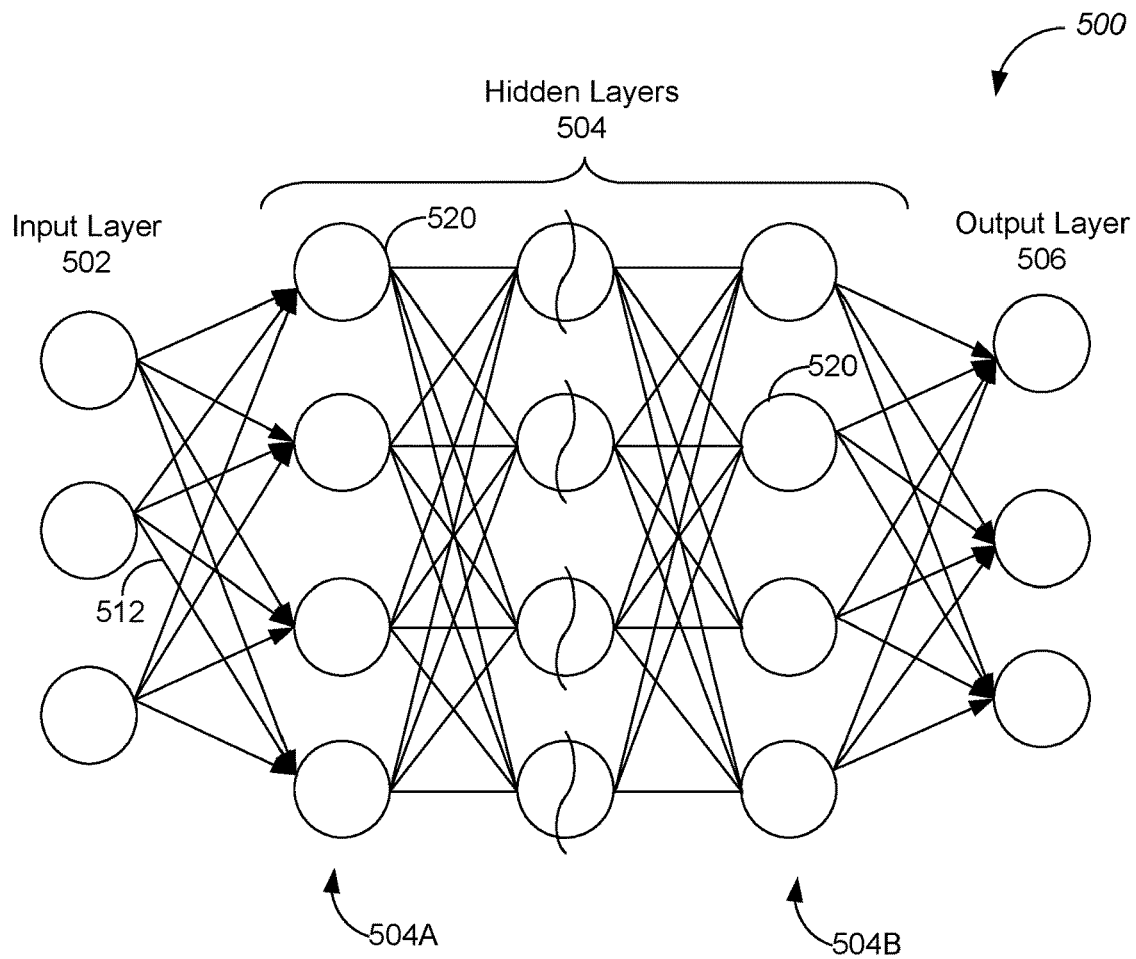
FIG. 5A is a structural diagram of an example neural network applied to process vehicle data in a vehicle data processing model, in accordance with some embodiments.
Figure 5B:
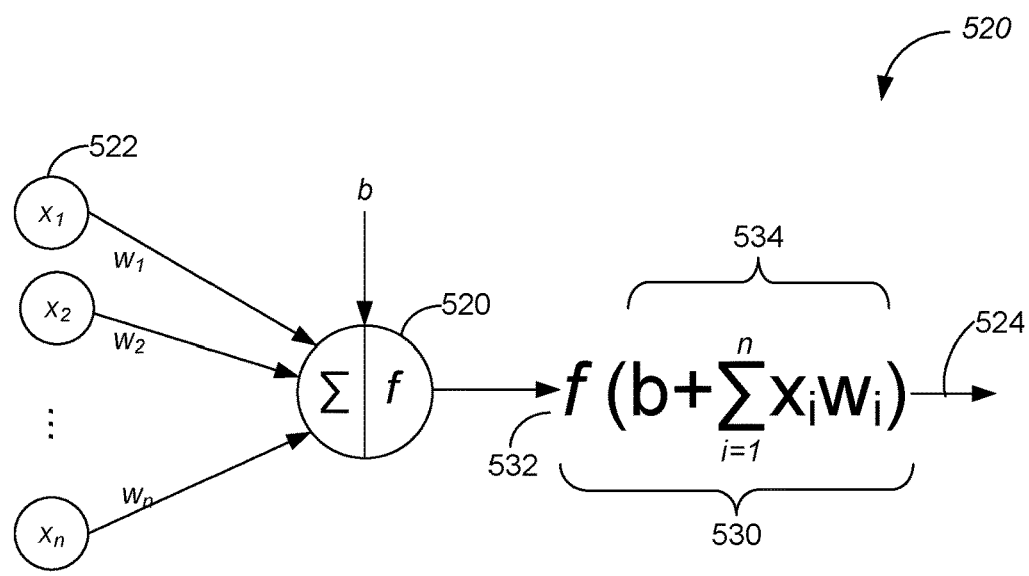
FIG. 5B is an example node in the neural network, in accordance with some embodiments.

FIGS. 4, 5A, and 5B provide background on the machine learning systems described herein, which are helpful in understanding the details of the embodiments described from FIG. 6 onward.

FIG. 4 is a block diagram of a machine learning system 400 for training and applying machine learning models 250 for facilitating driving of a vehicle, in accordance with some embodiments. The machine learning system 400 includes a model training module 226 establishing one or more machine learning models 250 and a data processing module 228 for processing vehicle data 112 using the machine learning model 250. In some embodiments, both the model training module 226 (e.g., the model training module 226 in FIG. 2) and the data processing module 228 are located within the vehicle 102, while a training data source 404 provides training data 248 to the vehicle 102. In some embodiments, the training data source 404 is the data obtained from the vehicle 102 itself, from a server 104, from storage 106, or from a another vehicle or vehicles 102. Alternatively, in some embodiments, the model training module 226 (e.g., the model training module 226 in FIG. 3) is located at a server 104, and the data processing module 228 is located in a vehicle 102. The server 104 trains the data processing models 250 and provides the trained models 250 to the vehicle 102 to process real-time vehicle data 112 detected by the vehicle 102. In some embodiments, the training data 248 provided by the training data source 404 include a standard dataset (e.g., a set of road images) widely used by engineers in the autonomous vehicle industry to train machine learning models 250. In some embodiments, the training data 248 includes vehicle data 112 and/or additional vehicle information 114, which is collected from one or more vehicles 102 that will apply the machine learning models 250 or collected from distinct vehicles 102 that will not apply the machine learning models 250. The vehicle data 112 further includes one or more of sensor data 254, road mapping and location data 256, and control data 259. Further, in some embodiments, a subset of the training data 248 is modified to augment the training data 248. The subset of modified training data is used in place of or jointly with the subset of training data 248 to train the machine learning models 250.

In some embodiments, the model training module 226 includes a model training engine 410, and a loss control module 412. Each machine learning model 250 is trained by the model training engine 410 to process corresponding vehicle data 112 to implement a respective on-vehicle task. The on-vehicle tasks include, but are not limited to, perception and object analysis 230, vehicle localization and environment mapping 232, vehicle drive control 234, vehicle drive planning 236, local operation monitoring 238, and vehicle action and behavior prediction 240 (FIG. 2). Specifically, the model training engine 410 receives the training data 248 corresponding to a machine learning model 250 to be trained, and processes the training data to build the machine learning model 250. In some embodiments, during this process, the loss control module 412 monitors a loss function comparing the output associated with the respective training data item to a ground truth of the respective training data item. In these embodiments, the model training engine 410 modifies the machine learning models 250 to reduce the loss, until the loss function satisfies a loss criteria (e.g., a comparison result of the loss function is minimized or reduced below a loss threshold). The machine learning models 250 are thereby trained and provided to the data processing module 228 of a vehicle 102 to process real-time vehicle data 112 from the vehicle.

In some embodiments, the model training module 402 further includes a data pre-processing module 408 configured to pre-process the training data 248 before the training data 248 is used by the model training engine 410 to train a machine learning model 250. For example, an image pre-processing module 408 is configured to format road images in the training data 248 into a predefined image format. For example, the preprocessing module 408 may normalize the road images to a fixed size, resolution, or contrast level. In another example, an image pre-processing module 408 extracts a region of interest (ROI) corresponding to a drivable area in each road image or separates content of the drivable area into a distinct image.

In some embodiments, the model training module 226 uses supervised learning in which the training data 248 is labelled and includes a desired output for each training data item (also called the ground truth in some situations). In some embodiments, the desirable output is labelled manually by people or labelled automatically by the model training model 226 before training. In some embodiments, the model training module 226 uses unsupervised learning in which the training data 248 is not labelled. The model training module 226 is configured to identify previously undetected patterns in the training data 248 without pre-existing labels and with little or no human supervision. Additionally, in some embodiments, the model training module 226 uses partially supervised learning in which the training data is partially labelled.

In some embodiments, the data processing module 228 includes a data pre-processing module 414, a model-based processing module 416, and a data post-processing module 418. The data pre-processing modules 414 pre-processes vehicle data 112 based on the type of the vehicle data 112. In some embodiments, functions of the data pre-processing modules 414 are consistent with those of the pre-processing module 408, and convert the vehicle data 112 into a predefined data format that is suitable for the inputs of the model-based processing module 416. The model-based processing module 416 applies the trained machine learning model 250 provided by the model training module 226 to process the pre-processed vehicle data 112. In some embodiments, the model-based processing module 416 also monitors an error indicator to determine whether the vehicle data 112 has been properly processed in the machine learning model 250. In some embodiments, the processed vehicle data is further processed by the data post-processing module 418 to create a preferred format or to provide additional vehicle information 114 that can be derived from the processed vehicle data. The data processing module 228 uses the processed vehicle data to at least partially autonomously drive the vehicle 102 (e.g., at least partially autonomously). For example, the processed vehicle data includes vehicle control instructions that are used by the vehicle control system 290 to drive the vehicle 102.

In some embodiments, the data processing module 228 of the vehicle 102 (e.g., a first vehicle) is applied to perform perception and object analysis 230 by obtaining a road image including a road surface along which the first vehicle is travelling, identifying one or more identifiable objects on the road surface in the road image, and detecting a plurality of objects on the road surface in the road image. The data processing module 228 eliminates the one or more identifiable objects from the plurality of objects in the road image to determine one or more unidentifiable objects on the road surface in the road image. The first vehicle is at least partially autonomously driven by treating the one or more unidentifiable objects differently from the one or more identifiable objects. Further, in some embodiments, the machine learning models 250 of the vehicle 102 includes an object detection model 230A and a drivable area model 230B. The object detection model 230A is configured to identify the one or more identifiable objects in the road image and associate each identifiable object with a predefined object type or class. The drivable area model 230B is configured to determine a road surface in the road image. Additionally, in some embodiments, the machine learning models 250 includes a generic obstacle detection model 230C configured to detect a plurality of objects on the road surface in the road image, e.g., with or without determining a predefined object type or class of each of the plurality of objects. The generic obstacle detection model 230C is optionally modified from the drivable area model 230C by way of retraining.

FIG. 5A is a structural diagram of an example neural network 500 applied to process vehicle data in a machine learning model 250, in accordance with some embodiments, and FIG. 5B is an example node 520 in the neural network 500, in accordance with some embodiments. It should be noted that this description is used as an example only, and other types or configurations may be used to implement the embodiments described herein. The machine learning model 250 is established based on the neural network 500. A corresponding model-based processing module 416 applies the machine learning model 250 including the neural network 500 to process vehicle data 112 that has been converted to a predefined data format. The neural network 500 includes a collection of nodes 520 that are connected by links 512. Each node 520 receives one or more node inputs 522 and applies a propagation function 530 to generate a node output 524 from the one or more node inputs. As the node output 524 is provided via one or more links 512 to one or more other nodes 520, a weight w associated with each link 512 is applied to the node output 524. Likewise, the one or more node inputs 522 are combined based on corresponding weights $w_1$, $w_2$, $w_3$, and $w_4$ according to the propagation function 530. In an example, the propagation function 530 is computed by applying a non-linear activation function 532 to a linear weighted combination 534 of the one or more node inputs 522.

The collection of nodes 520 is organized into layers in the neural network 500. In general, the layers include an input layer 502 for receiving inputs, an output layer 506 for providing outputs, and one or more hidden layers 504 (e.g., layers 504A and 504B) between the input layer 502 and the output layer 506. A deep neural network has more than one hidden layer 504 between the input layer 502 and the output layer 506. In the neural network 500, each layer is only connected with its immediately preceding and/or immediately following layer. In some embodiments, a layer is a "fully connected" layer because each node in the layer is connected to every node in its immediately following layer. In some embodiments, a hidden layer 504 includes two or more nodes that are connected to the same node in its immediately following layer for down sampling or pooling the two or more nodes. In particular, max pooling uses a maximum value of the two or more nodes in the layer for generating the node of the immediately following layer.

In some embodiments, a convolutional neural network (CNN) is applied in a machine learning model 250 to process vehicle data (e.g., video and image data captured by cameras 266 of a vehicle 102). The CNN employs convolution operations and belongs to a class of deep neural networks. The hidden layers 504 of the CNN include convolutional layers. Each node in a convolutional layer receives inputs from a receptive area associated with a previous layer (e.g., nine nodes). Each convolution layer uses a kernel to combine pixels in a respective area to generate outputs. For example, the kernel may be to a 3×3 matrix including weights applied to combine the pixels in the respective area surrounding each pixel. Video or image data is pre-processed to a predefined video/image format corresponding to the inputs of the CNN. In some embodiments, the pre-processed video or image data is abstracted by the CNN layers to form a respective feature map. In this way, video and image data can be processed by the CNN for video and image recognition or object detection.

In some embodiments, a recurrent neural network (RNN) is applied in the machine learning model 250 to process vehicle data 112. Nodes in successive layers of the RNN follow a temporal sequence, such that the RNN exhibits a temporal dynamic behavior. In an example, each node 520 of the RNN has a time-varying real-valued activation. It is noted that in some embodiments, two or more types of vehicle data are processed by the data processing module 228, and two or more types of neural networks (e.g., both a CNN and an RNN) are applied in the same machine learning model 250 to process the vehicle data jointly.

The training process is a process for calibrating all of the weights $w_i$ for each layer of the neural network 500 using training data 248 that is provided in the input layer 502. The training process typically includes two steps, forward propagation and backward propagation, which are repeated multiple times until a predefined convergence condition is satisfied. In the forward propagation, the set of weights for different layers are applied to the input data and intermediate results from the previous layers. In the backward propagation, a margin of error of the output (e.g., a loss function) is measured (e.g., by a loss control module 412), and the weights are adjusted accordingly to decrease the error. The activation function 532 can be linear, rectified linear, sigmoidal, hyperbolic tangent, or other types. In some embodiments, a network bias term b is added to the sum of the weighted outputs 534 from the previous layer before the activation function 532 is applied. The network bias b provides a perturbation that helps the neural network 500 avoid over fitting the training data. In some embodiments, the result of the training includes a network bias parameter b for each layer.

Generic Obstacle Detection in Drivable Area

As explained above, a vehicle 102 has a plurality of sensors 260 including one or more cameras 266. In some embodiments, when the vehicle 102 drives on a road, a forward-facing camera 266 captures one or more road images. A road image can include a road surface along which the vehicle 102 is travelling. In some embodiments, the road images are processed to identify one or more features on the road. For example, in some embodiments, an object detection model 230A (FIG. 4) is applied to identify one or more identifiable objects (e.g., known objects) on the road surface. The object detection model 230A is trained to detect objects that belong to a predefined set of classes (e.g., known classes) (e.g., vehicles, lane lines, traffic lights, cones, pedestrians, and bicycles). In some embodiments, in accordance with a determination that the road surface includes an object that belongs to the predefined set of classes, the object detection model 230A identifies the class to which the object belongs and the location of the object on the road surface, and/or generates a bounding box around the object at the location of the object on the road surface. Conversely, in some embodiments, in accordance with a determination that the road surface includes an object that does not belong to the predefined set of classes, the object detection model 230A fails to detect the object, e.g., identifies an incorrect class to which the object belongs and/or generates a bounding box whose location does not match the location of the object on the road surface.

Figure 6A:
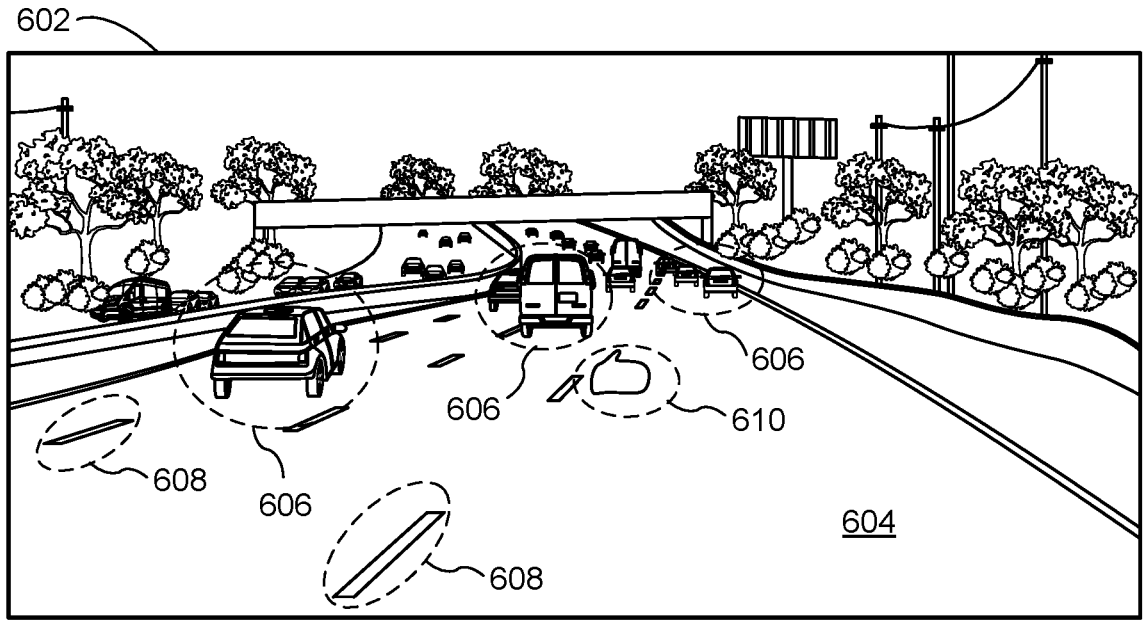
FIGS. 6A and 6B are two example road images, each of which includes a forward-facing view of a road, in accordance with some embodiments.
Figure 6B:
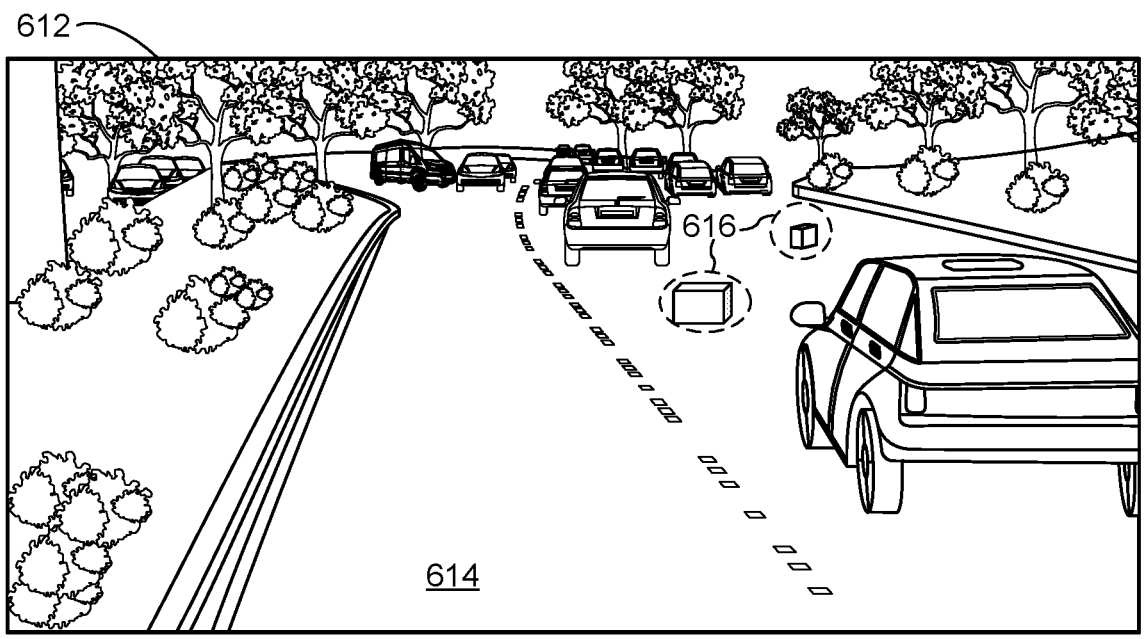

In contrast to an identifiable object (e.g., a known object), which belongs to a predefined class, a generic obstacle broadly refers to an object on a road surface, independently of whether the object is categorized into any specified or predefined class or not. Some examples of generic obstacles include obstacle vehicles that can be categorized into a specified class. Alternatively, some examples of generic obstacles that can be found on a road include trash, mattresses, boxes, tree branches, live animals, and dead animals, which cannot be detected or categorized by an object detection model 230A. FIGS. 6A and 6B are two example road images 602 and 612, each of which includes a forward-facing view of a road, in accordance with some embodiments. The road image 602 includes a road surface 604. The road surface 604 includes vehicles 606, lane lines 608, and a trash bag 610. In some embodiments, the vehicles 606 and the lane lines 608 are identifiable objects (e.g., with belonging to a respective predefined class), e.g., can be detected or classified by the object detection model 230A. In some embodiments, the trash bag 610 is a generic obstacle that is not categorized into a specified class. The road image 612 includes a road surface 614 on which cardboard boxes 616 are located, and the cardboard boxes 616 are optionally generic obstacles that are not categorized into a specified class. In some embodiments, generic obstacles, such as the trash bag 610 and the cardboard boxes 616, are objects that cannot be detected (or are wrongly detected) by an object detection model 230A.

FIGS. 7A-7D are a sequence of images illustrating an example process 700 for generic obstacle detection, in accordance with some embodiments. The process 700 is implemented by a first vehicle 102A (e.g., in FIG. 8) having one or more processors (e.g., processing unit(s) 202 in FIG. 2) and memory (e.g., memory 206 in FIG. 2). The first vehicle 102A obtains a road image 702 of a road. In some embodiments, the road image 702 is captured using one or more cameras 266 of the first vehicle 102A. In some embodiments, the first vehicle 102A receives the road image 702 from a distinct electronic device (e.g., a mobile phone or an adjacent vehicle 102 having a camera that captured the road image 702). The road image 702 includes a road surface 704 along which the first vehicle 102A is travelling.

In some embodiments, the first vehicle 102A identifies one or more identifiable objects on the road surface in the road image. In some embodiments, an identifiable object refers to an object that belongs to a specific, identifiable (e.g., predefined, known) class. For example, in FIG. 7A, the identifiable objects on the road surface 704 include obstacle vehicles 706 (e.g., vehicle 706-1 to vehicle 706-4) that appeared in a field of view of a camera that captured the road image 702. In some embodiments, the identifiable objects on the road include traffic lights, bicycles, and/or lane markers. Particularly, in some situations, the identifiable objects are configured to create a traffic environment or condition, thereby impacting driving operations and behaviors.

In some embodiments, the first vehicle 102A detects a plurality of objects on the road surface in the road image 702. In some embodiments, the plurality of objects includes all identifiable and unidentifiable objects on the road surface. For example, in FIG. 7A, the plurality of objects includes the vehicles 706 (e.g., identifiable objects) and a box 708 (e.g., an unidentifiable object). In some embodiments, the unidentifiable object cannot be associated with any specific, identifiable (e.g., predefined, known) class detected by the object detection model 230A, and is a generic obstacle. Stated another way, in contrast to the identifiable object (e.g., a known object), which belongs to a predefined class, the generic obstacle broadly refers to either one of an identifiable object and an unidentifiable object, independently of whether a corresponding object is categorized into any specified or predefined class and whether the corresponding object is detectable by the object detection model 230A. In some embodiments, unidentifiable and identifiable objects are determined based on the object detection model 230A.

Figure 7A:
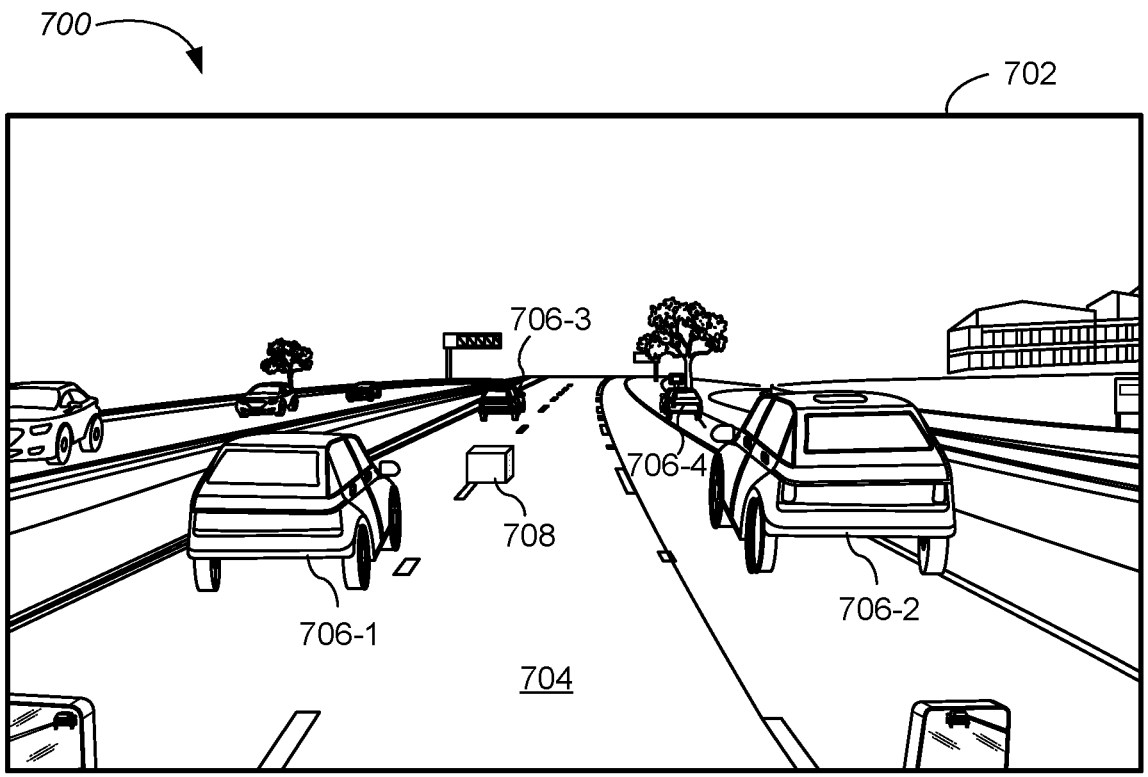
FIGS. 7A-7D are a sequence of images illustrating an example process for generic obstacle detection, in accordance with some embodiments.
Figure 7B:
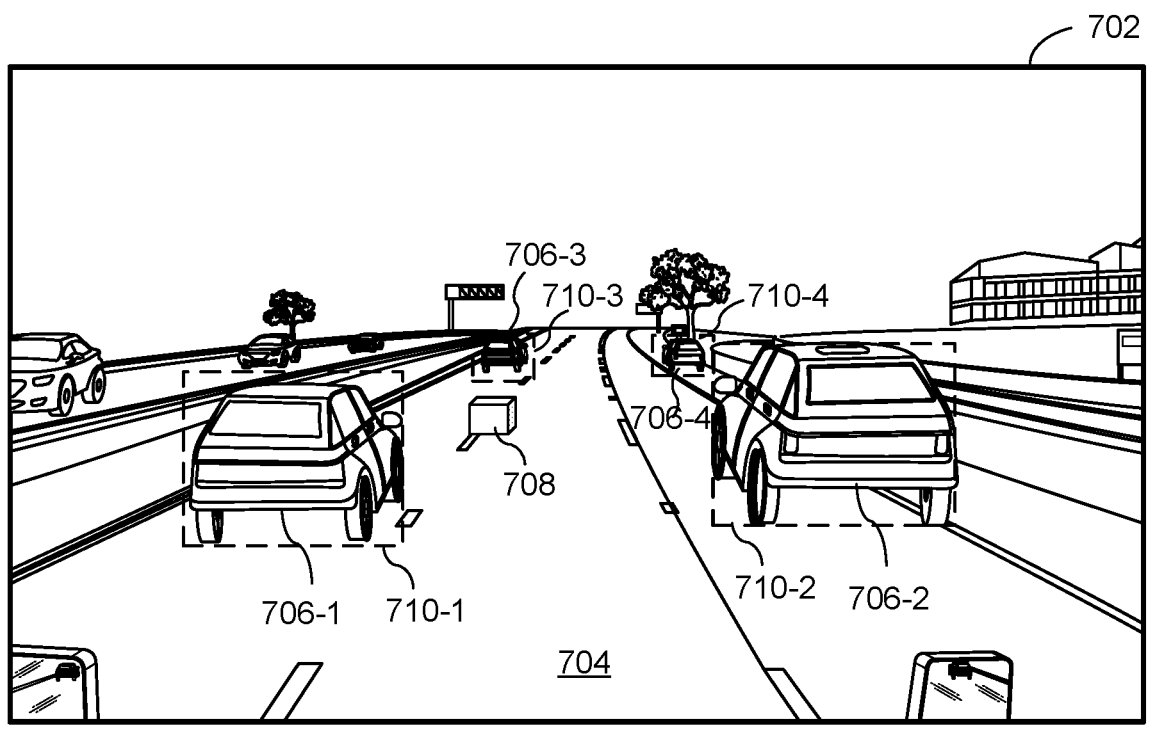

In some embodiments, the one or more identifiable objects are identified using machine learning. For example, in some embodiments, an object detection model 230A (FIG. 4) is applied to identify the one or more identifiable objects 706 and generate one or more bounding boxes 710 around the one or more identifiable objects. In some embodiments, a bounding box 710 is generated for a respective one of the identifiable objects in the road image 702. FIG. 7B illustrates a bounding box 710-1 that is generated around the vehicle 706-1, a bounding box 710-2 that is generated around the vehicle 706-2, a bounding box 710-3 that is generated around the vehicle 706-3, and a bounding box 710-4 that is generated around the vehicle 706-4. In some embodiments, a generic obstacle detection model 230C (FIGS. 4 and 8) is distinct from the object detection model 230A, and applied to detect the plurality of objects.

Figure 7C:
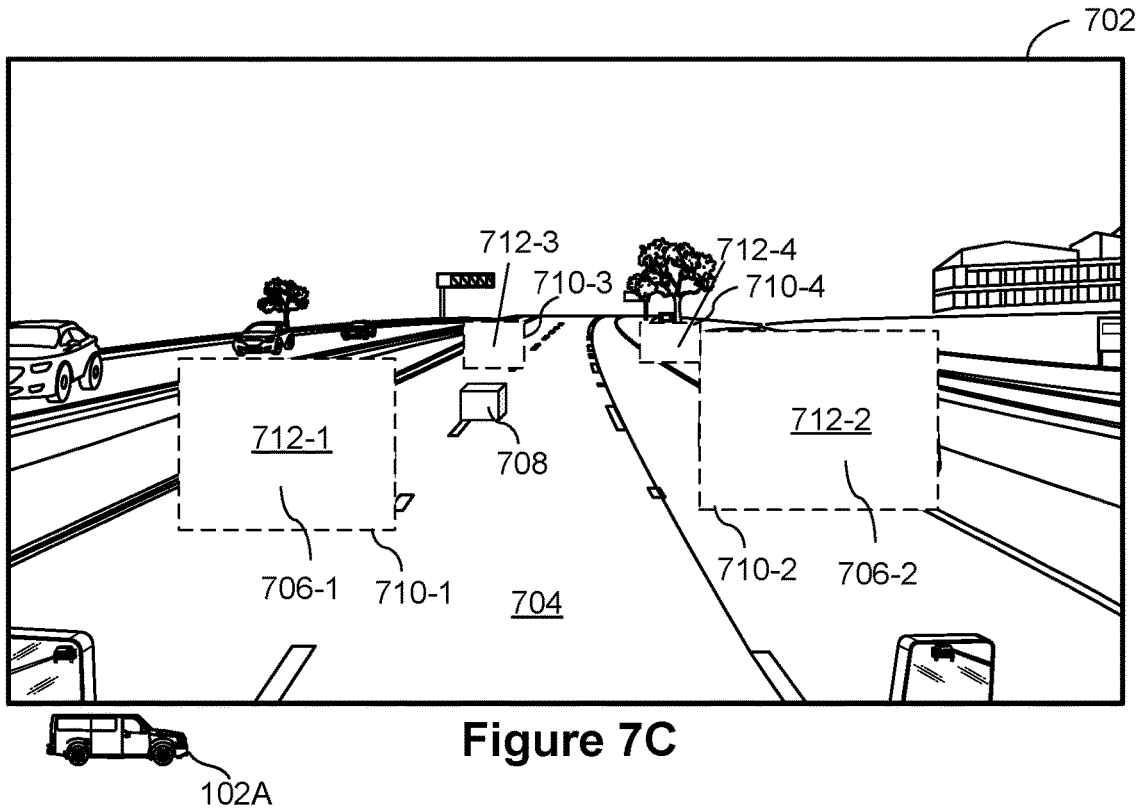
Figure 7D:
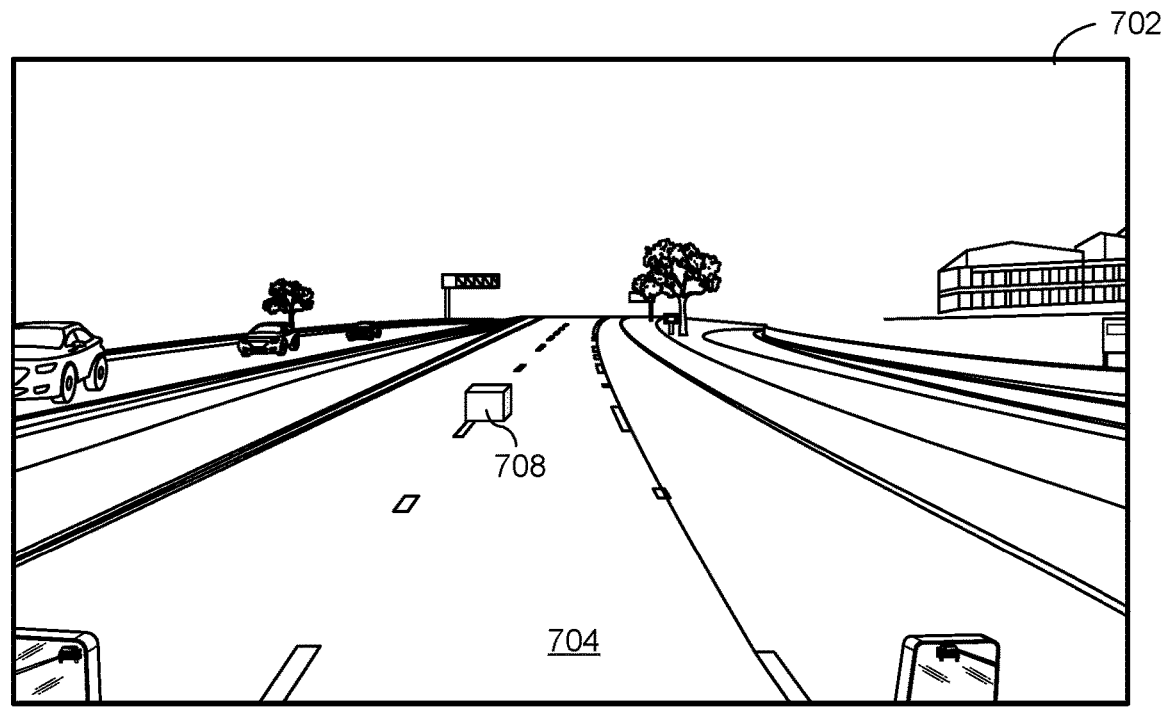

In some embodiments, the first vehicle 102A eliminates the one or more identifiable objects from the plurality of objects in the road image to determine one or more unidentifiable objects on the road surface in the road image. FIGS. 7C and 7D illustrate that, in some embodiments, eliminating the one or more identifiable objects from the plurality of objects includes overlaying the one or more bounding boxes 710 over the plurality of objects (e.g., vehicles 706 and box 708) detected in the road image, and filtering out one or more regions 712 corresponding to an intersection (e.g., overlap) between the one or more bounding boxes and the plurality of objects, thereby identifying the one or more unidentifiable objects (e.g., the box 708, in this case) on the road surface in the road image.

In some embodiments, the first vehicle 102A can eliminate the one or more identifiable objects from the plurality of objects by comparing the one or more identifiable objects (e.g., vehicles 706-1 to 706-4) and the plurality of objects (e.g., vehicles 706-1 to 706-4 and box 708) to filter out the one or more identifiable objects from the plurality of objects, thereby identifying the one or more unidentifiable objects (e.g., box 708) on the road surface 704 in the road image 702.

In some embodiments, the first vehicle 102A drives at least partially autonomously by treating the one or more unidentifiable objects differently from the one or more identifiable objects. In some embodiments, the first vehicle 102A reacts differently to the one or more unidentifiable objects compared to the identifiable objects. For example, the first vehicle 102A predicts a respective future trajectory (e.g., velocity, direction of travel) for each of the identifiable objects while assuming that the unidentifiable objects are stationary.

In some embodiments, the first vehicle 102 determines that the one or more unidentifiable objects (e.g., box 708) are present within a predetermined distance from itself, and controls itself to drive according to a first trajectory (e.g., at a first velocity, a first acceleration, on the same lane, moving to a different lane) in response to the presence of the one or more unidentifiable objects. Further, in some embodiments, the first vehicle 102 determines that no unidentifiable object and at least a first identifiable object is present within a predetermined distance from itself, and controls itself to drive according to a second trajectory (e.g., at a second velocity, a second acceleration, on the same lane, moving to a different lane) in response to the presence of the first identifiable object. The second trajectory is distinct from the first trajectory. Additionally, in some embodiments, the first vehicle 102 determines that no identifiable or unidentifiable object is present within the predetermined distance from itself, and controls itself to drive according to a third trajectory (e.g., at a third velocity, a third acceleration, on the same lane, moving to a different lane). The third trajectory is distinct from the first and the second trajectories.

Figure 8:
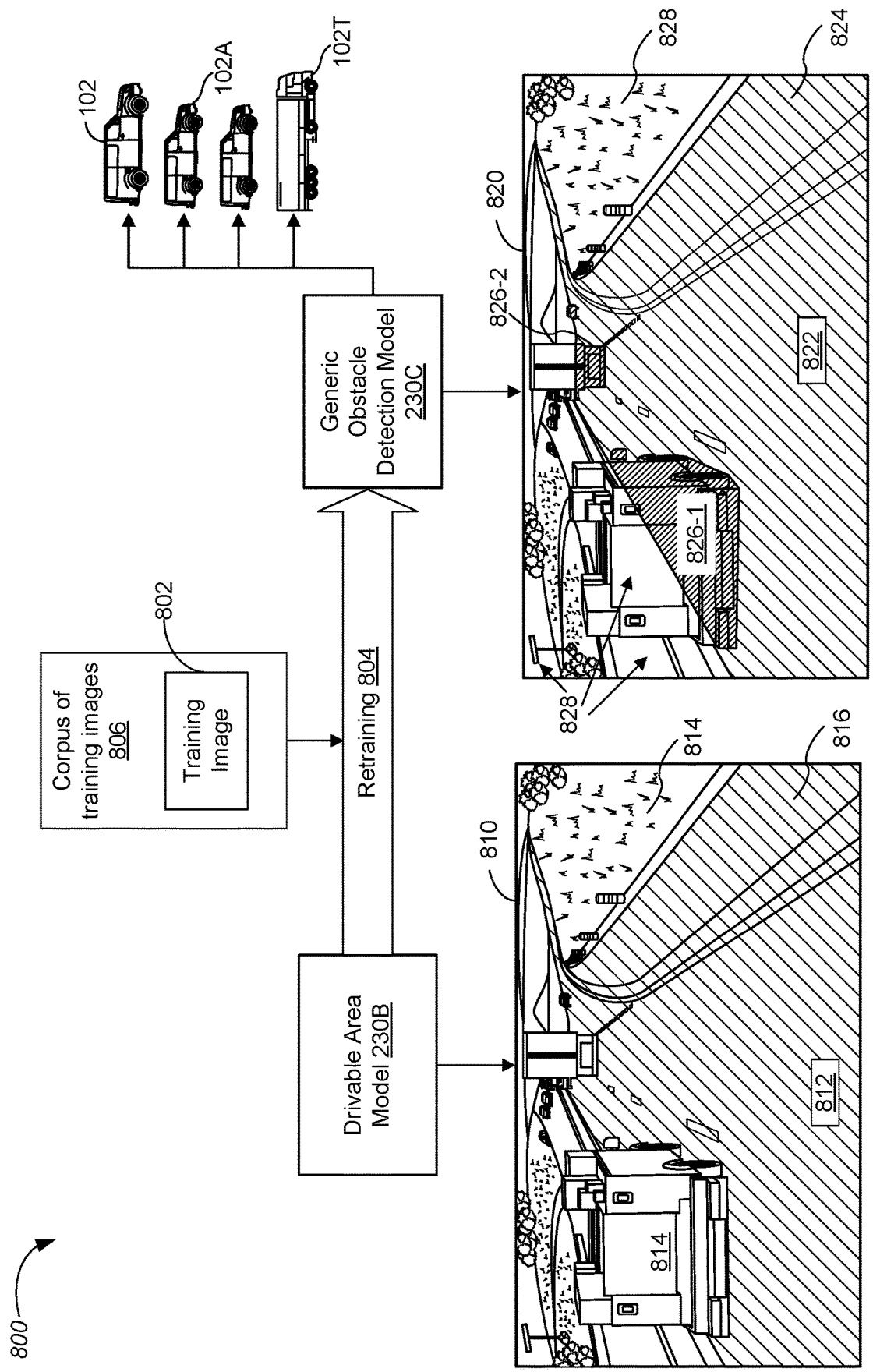
FIG. 8 illustrates a workflow for generating a generic obstacle detection model, in accordance with some embodiments.

FIG. 8 illustrates a workflow 800 for generating a generic obstacle detection model 230C, in accordance with some embodiments. In some embodiments, the generic obstacle detection model 230C (FIG. 4) is generated by retraining a drivable area model 230B (FIG. 4) using a corpus of training images 806. In some embodiments, the drivable area model 230B is a binary segmentation model that outputs a drivable area category and a background category. The drivable area model 230B obtains a training image 802 and segments the training image 802 into a drivable area 812 and one or more background areas 814 complementary to the drivable area 812 as shown in a first road image 810. The drivable area 812 includes a road surface and is represented by the shaded lines in the first road image 810. The one or more background areas 814 include remaining areas in the first road image 810 that are not part of the drivable area 812 represented by the shaded lines. In some embodiments, the drivable area 812 includes a road surface, and the road surface includes a surface on which a first vehicle 102A is driving and a surface ahead of the first vehicle 102A. In some embodiments, the road surface is not constrained by the boundaries of the lane markings. In some embodiments, the road surface extends to a road shoulder 816 on which the first vehicle 102A can drive as well. The road shoulder 816 is optionally made of asphalt, cement, unpaved ground, or the like.

In some embodiments, the generic obstacle detection model 230C is obtained by retraining (e.g., using machine learning) the drivable area model 230B via a retraining process 804. In some embodiments, the retraining process 804 includes machine learning. In some embodiments, the retraining process 804 adds an extra model output to the drivable area model 230B to generate the generic obstacle detection model 230C including the extra model output. In some embodiments, the extra model output of the generic obstacle detection model 230C indicates a generic obstacle category. In some embodiments, the generic obstacle detection model 230C is configured to predict: (1) a drivable area category, (2) a background category, and a (3) generic obstacle category.

In some embodiments, the generic obstacle detection model 230C obtains the training image 802 and segments the training image 802 into a drivable area 822 represented by the wider-spaced shaded lines in a different image 820, one or more generic obstacle regions 826 represented by the finer-spaced shaded lines (e.g., generic obstacle region 826-1 and generic obstacle region 826-2), and one or more background regions 828 as shown in a second road image 820.

In some embodiments, the drivable area 822 includes a road surface of the road image 820. In some embodiments, the drivable area 822 extends beyond the road surface and includes a road shoulder 824, next to the road surface, on which the first vehicle 102A can drive as well. The road shoulder 824 is optionally made of asphalt, cement, unpaved ground, or the like. The one or more generic obstacle regions 826 are regions that the generic obstacle detection model 230C expects the road surface to be, but these regions are not the road surface because they are occluded by one or more objects (e.g., identifiable or unidentifiable). The one or more background regions 828 are remaining regions in the image 820 that are not classified as drivable area and not classified as a generic obstacle region 826. Because the generic obstacle detection model 230C outputs one of a drivable area category, a background category, and a generic obstacle category, it is agnostic to object type. Stated another way, the generic obstacle detection model 230C identifies existence of one or more objects or obstacles on the road surface, independently of whether each of these objects or obstacles is associated with any specific or known object class or none of the specific or known object classes.

In some embodiments, the generic obstacle detection model 230C is trained at a server 104, and distributed to one or more vehicles 102, including the first vehicle 102A, and/or a vehicle 102T. When in use, the generic obstacle detection model 230C is applied to detect objects (e.g., identifiable objects and unidentifiable objects) on a road surface in the road image obtained in real time during driving.

Figure 9:
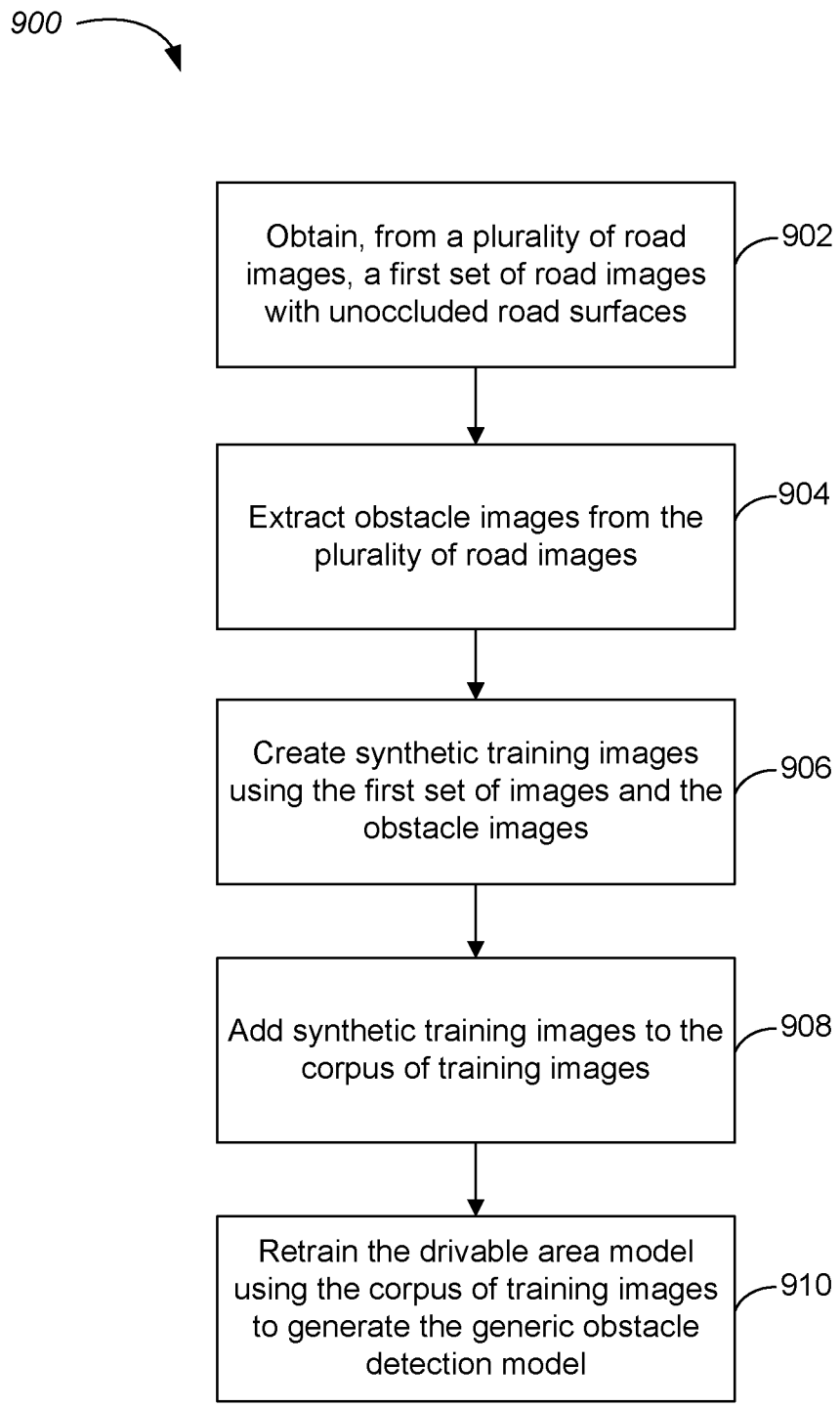
FIG. 9 illustrates a workflow for generating a corpus of training images, in accordance with some embodiments.
Figure 10A:
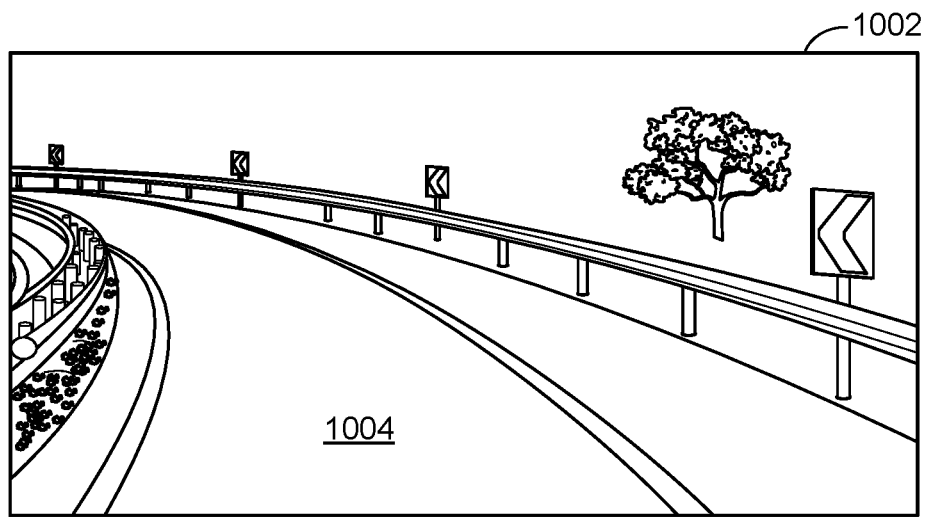
FIGS. 10A and 10B are two example road images that are applied to generate one or more training images, in accordance with some embodiments.
Figure 10B:
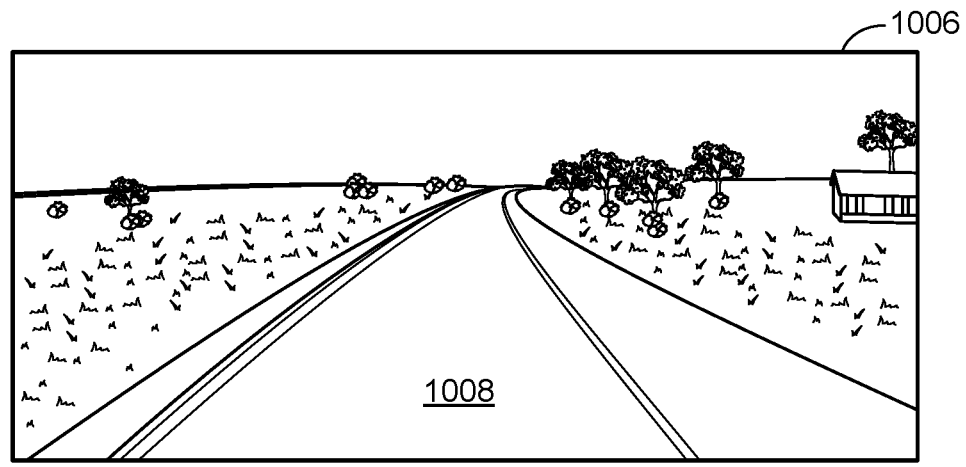

FIG. 9 illustrates a workflow 900 for generating a corpus of training images 806, in accordance with some embodiments. FIGS. 10A and 10B are two example road images 1002 and 1006 that are applied to generate one or more training images 806, in accordance with some embodiments.

Figure 11:
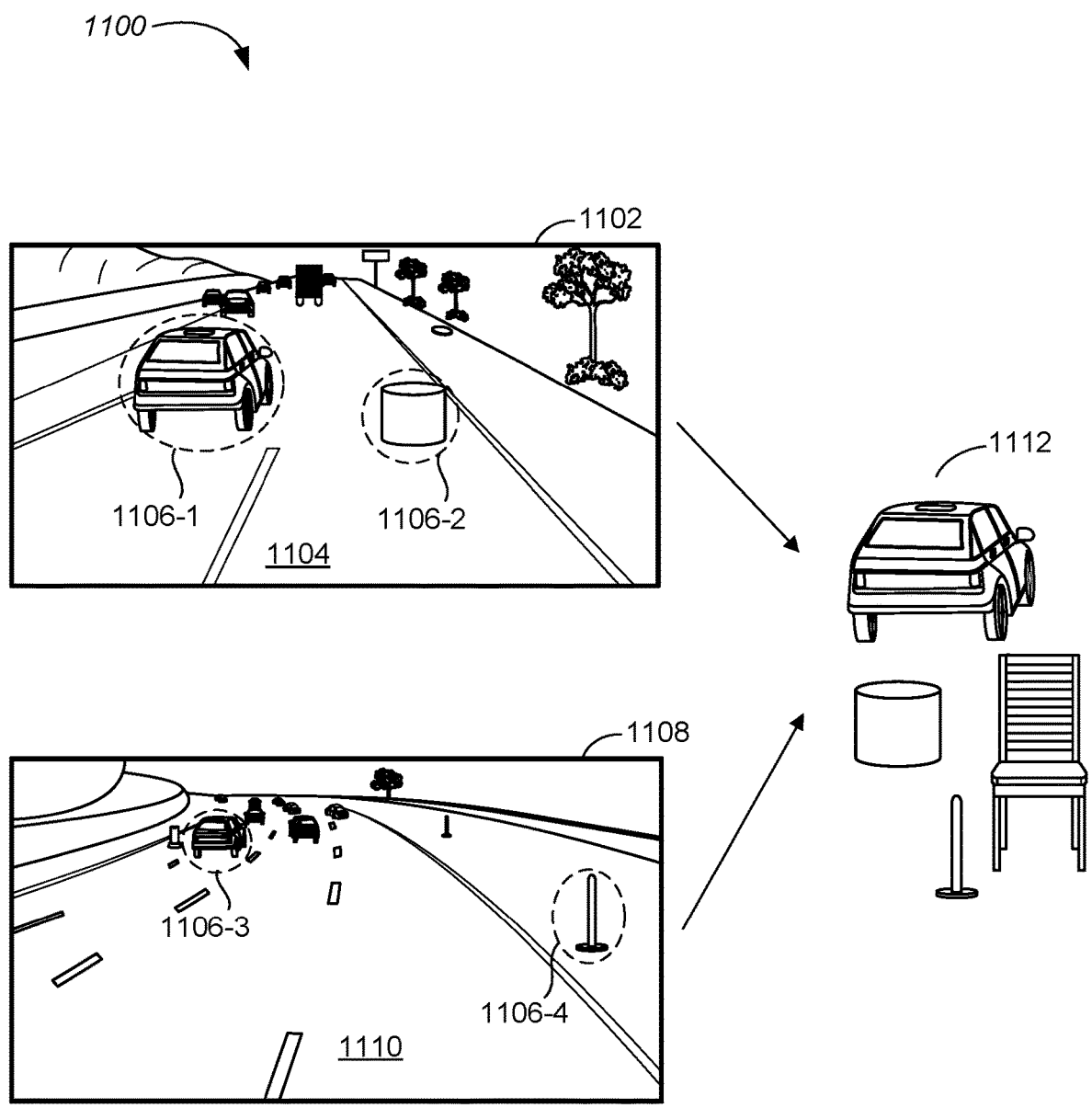
FIG. 11 illustrates an example obstacle image extraction process, in some embodiments.
Figure 12:
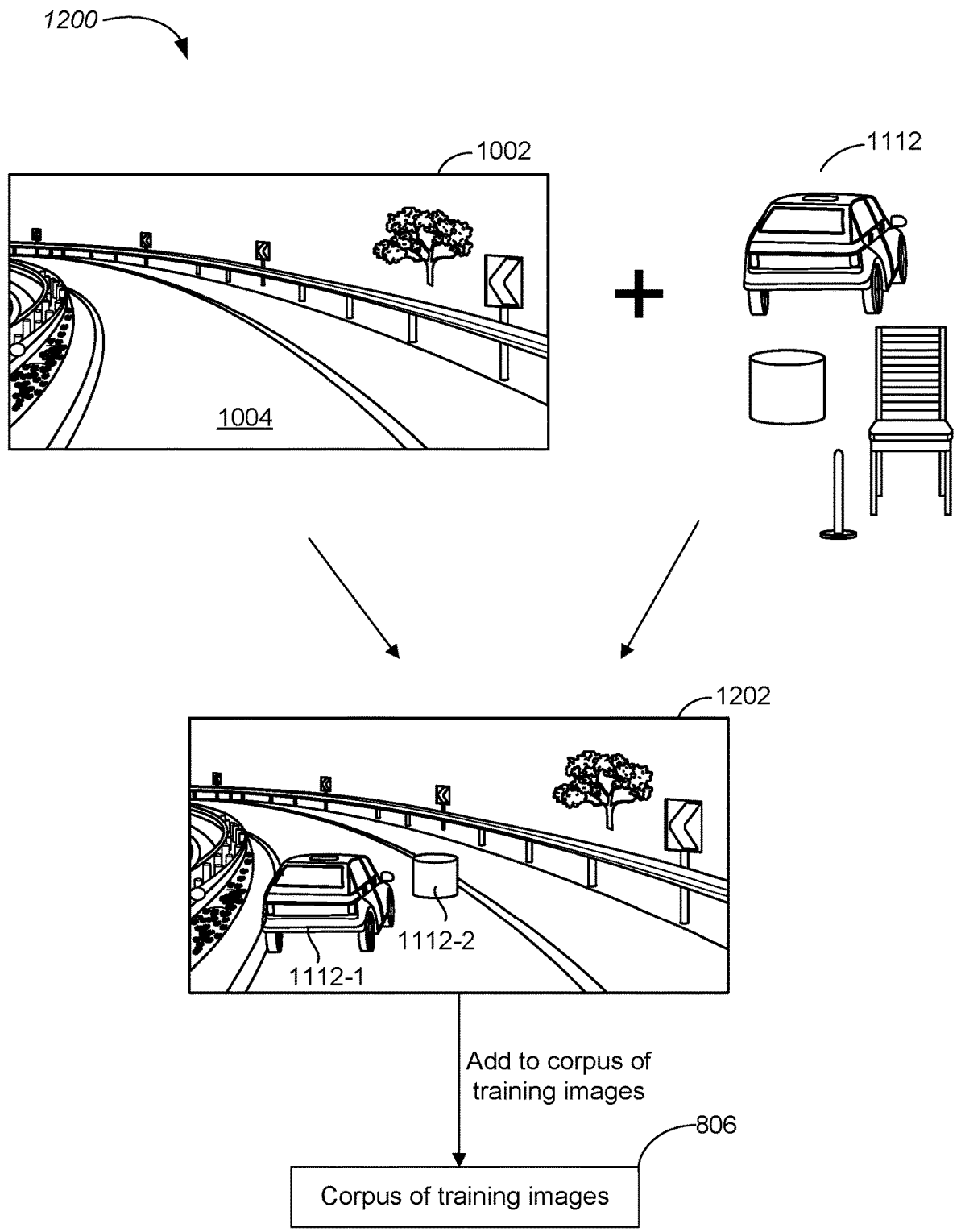
FIG. 12 is a flow diagram of an example process for creating an synthetic training image, in accordance with some embodiments.

FIG. 11 illustrates an example obstacle image extraction process 1100, in some embodiments. FIG. 12 is a flow diagram of an example process 1200 for creating an synthetic training image 1202, in accordance with some embodiments.

Referring to FIG. 9, in some embodiments, the workflow 900 includes obtaining (902), from a plurality of road images, a first set of road images with unoccluded road surfaces. In some embodiments, the first set of road images include the road images 1002 and 1006 having unoccluded road surfaces. In some embodiments, the workflow 900 includes extracting (904) obstacle images from the plurality of images. Referring to FIG. 11, during the obstacle image extraction process 1100, obstacle images 1112 are extracted from corresponding regions 1106 (e.g., 1106-1 to 1106-4) of road images 1102 and 1108 using one or more segmentation masks. In some embodiments, each of the obstacle images 1112 has a respective contour that completely lies within a drivable area 1104 and 1110 of a road surface of the road images 1102 and 1108. As previously discussed, the drivable area includes a road shoulder in some embodiments.

In some embodiments, the workflow 900 includes creating (906) synthetic training images using the first set of images (e.g., road images 1002 and 1006 in FIGS. 10A-10B) and the obstacle images (e.g., obstacle images 1112 in FIG. 11). Referring to FIG. 12, during the process 1200 of creating the synthetic training image 1202, one or more obstacle images 1112 (extracted in step 904) are placed onto a respective unconcluded road surface of a road image (e.g., road image 1002 or road image 1004) in the first set of images (obtained in step 902) to generate the synthetic training image 1202 (also called a synthetic patching augmented image). The synthetic training image 1202 is then added to the corpus of training images 806. In some embodiments, the process 1200 creates a plurality of (e.g., distinct) synthetic training images 1202 that are added to the corpus of training images 806. In some embodiments, the synthetic training images 1202 are labeled to generate a plurality of labeled training images 1202 having ground truth information. Regions that are occluded by the obstacle images 1112 on the drivable area are used to label a generic obstacle. For example, a first region occluded by a vehicle 1112-1 is labelled as a first generic obstacle, and a second region occluded by a bucket 1112-2 is labelled as a second generic obstacle. In some embodiments, ground truth information of the first and second generic obstacle is determined accurately (e.g., associated with a set of pixels) because the position at which a respective obstacle image 1112 is placed onto a respective unconcluded road surface and a geometry of the respective obstacle image 1112 are known.

In some embodiments, the workflow 900 includes adding (908) the synthetic training images 1202 to the corpus of training images 806, and retraining (910) the drivable area model 230B using the corpus of training images 806, e.g., with the ground truth information labeled on the synthetic training images 1202, to generate the generic obstacle detection model 230C.

Figure 13A:
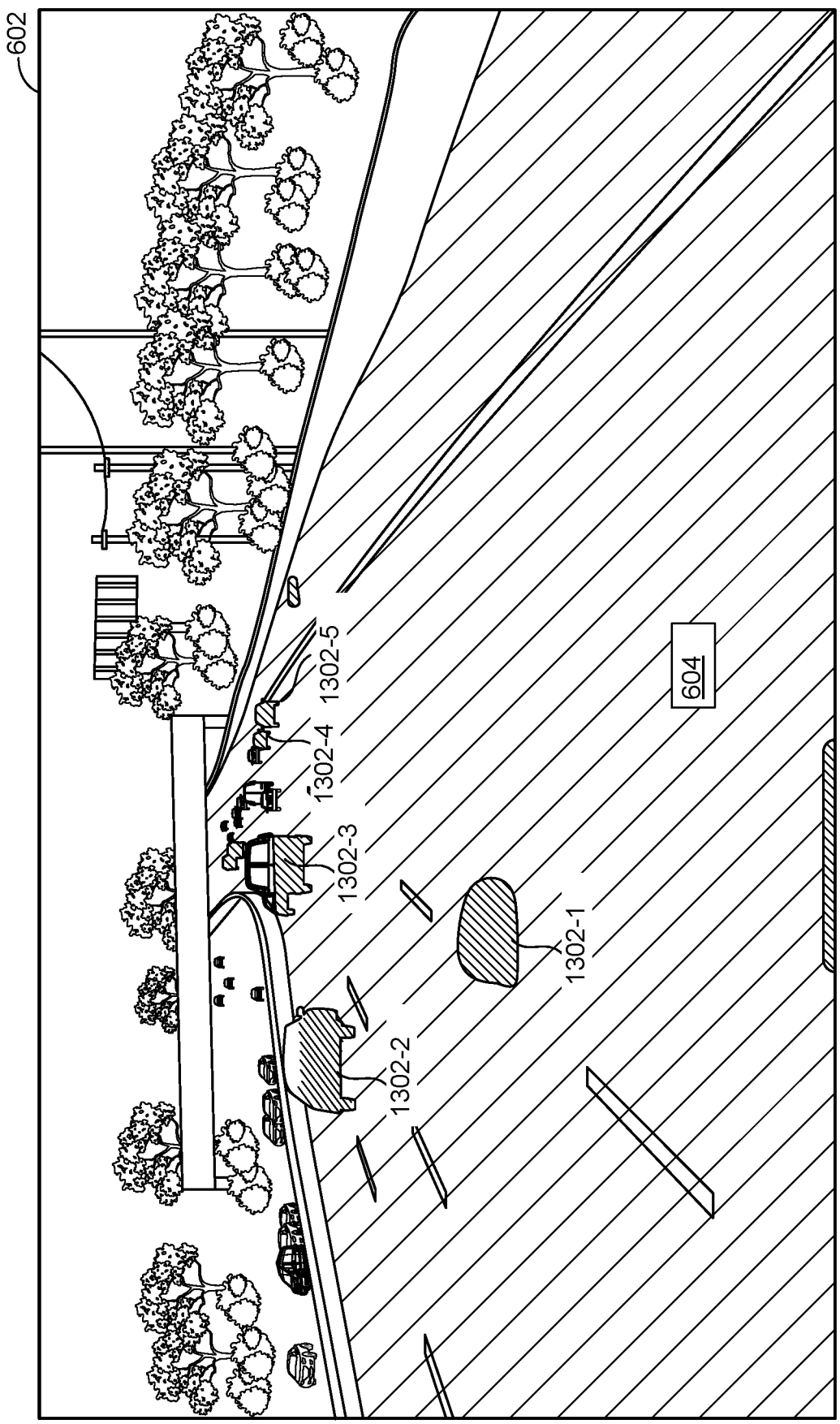
FIG. 13A is an example road image including generic obstacles identified by a generic obstacle detection model, in accordance with some embodiments.
Figure 13B:
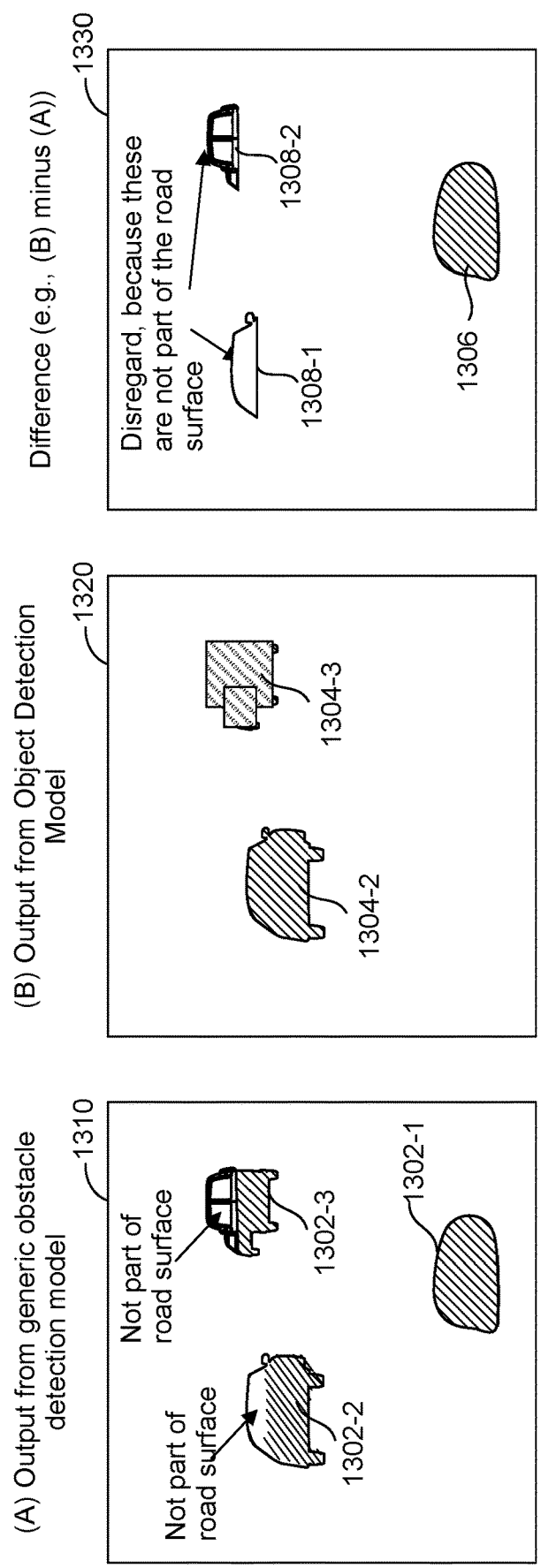
FIG. 13B illustrates comparison of objects detected by a generic obstacle detection model and an object detection model, in accordance with some embodiments.

FIG. 13A is an example road image 602 including generic obstacles identified by a generic obstacle detection model 230C, in accordance with some embodiments, and FIG. 13B illustrates comparison of objects detected by a generic obstacle detection model 230C and an object detection model 230A, in accordance with some embodiments. Referring to FIG. 13A, in some embodiments, the generic obstacle detection model 230C identifies a road surface 604 in the road image 602 and identifies all obstacles on the road surface. In some embodiments, the generic obstacle detection model 230C segments out all obstacles that cover the road surface. In FIG. 13, the generic obstacle detection model 230C segments out regions 1302-1, 1302-2, 1302-3, 1302-4, and 1305-5, corresponding to obstacles (e.g., generic obstacles) on the road surface 604, e.g., independently of an object type or class of each generic obstacle.

Referring to FIG. 13B, in some embodiments, the segmented regions 1302 outputted by the generic obstacle detection model 230C are compared with results of an object detection model 230A (FIG. 4) that detects identifiable object. A subset of the segmented regions 1302-1, 1302-2, and 1303-3 is used to compare the generic obstacle detection model 230C and the object detection model 230A. A first image 1310 shows that each of the segmented regions 1302-2 and 1302-3 includes only a portion (e.g., not all of) of the respective vehicle. The generic obstacle detection model 230C functions without requiring knowledge of object type, and is configured to determine whether an object is part of a road surface or not. The output from the object detection model 230A, as shown in the second image 1320, identifies two identifiable objects 1304-2 and 1304-3, corresponding to a known object class of vehicles. A third image 1330 shows the difference (e.g., subtraction) between the images 1320 and 1310. The image 1330 includes an unidentifiable object 1306. The unidentifiable object 1306 is not connected with or overlaps any part of the two identifiable objects 1304-2 and 1304-3 identified by the object detection model 230A. In some embodiments, the objects 1308-1 and 1308-2 are disregarded as not impacting a traffic environment or condition, because the generic obstacle detection model 230C has already established that the objects 1308-1 and 1308-2 are not part of the road surface (see image 1310).

Figure 14:
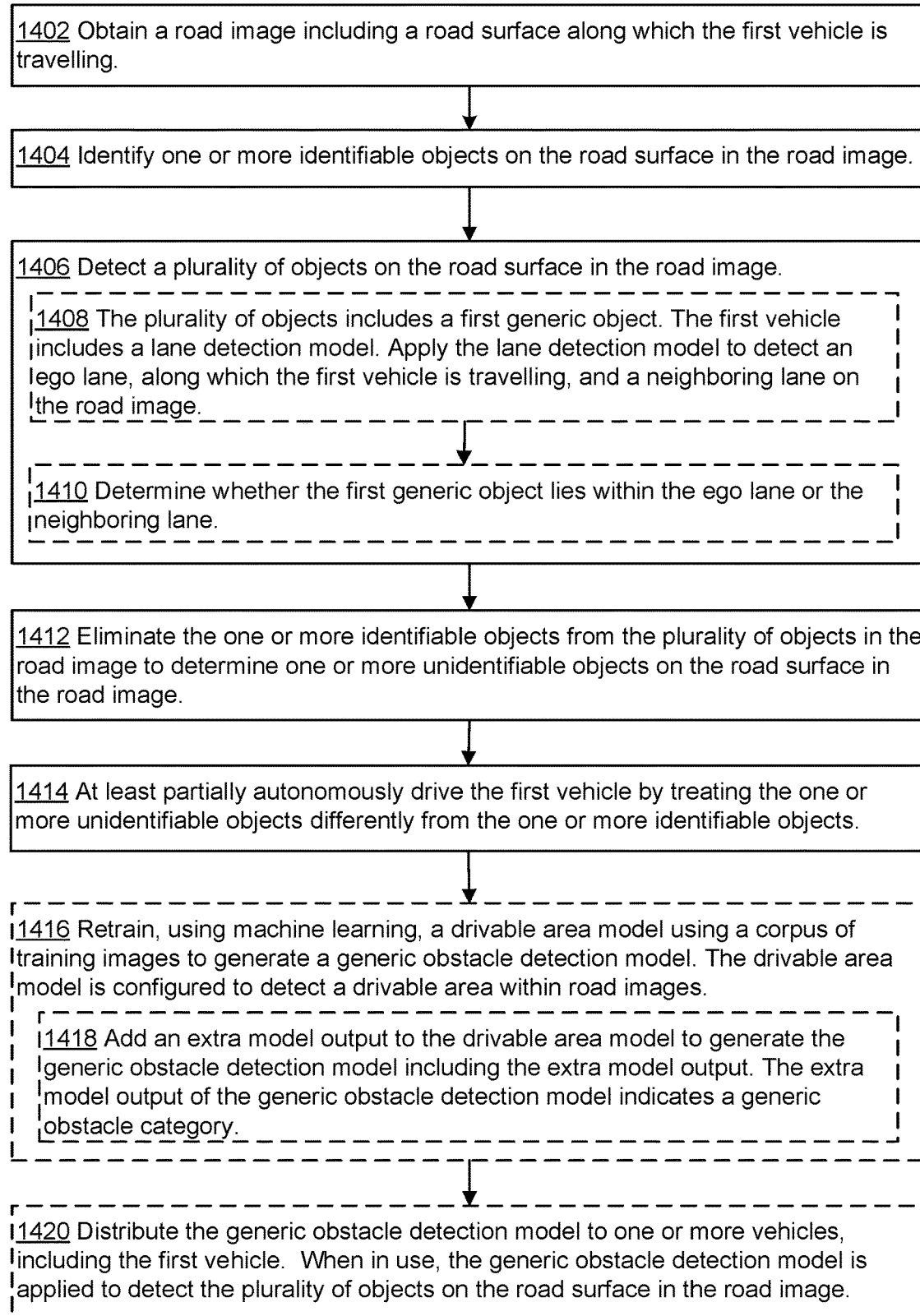
FIG. 14 illustrates a flow diagram of an example method for generic obstacle detection, in accordance with some embodiments.

FIG. 14 illustrates a flow diagram of an example method 1400 for generic obstacle detection, in accordance with some embodiments. In some embodiments, the method 1400 is performed at a first vehicle (e.g., first vehicle 102A) having one or more processors (e.g., processing unit(s) 202) and memory (e.g., memory 206). In some embodiments, the first vehicle includes one or more cameras (e.g., cameras 266). Specifically, in some embodiments, a data processing module 228 (FIG. 2) of the first vehicle 102A is applied to perform the method 1400 for perception and object analysis 230. The first vehicle obtains (1402) a road image including a road surface along which the first vehicle is travelling. The first vehicle identifies (1404) one or more identifiable objects on the road surface in the road image. In some embodiments, the first vehicle applies an object detection model 230A (FIG. 4) to identify the generates one or more bounding boxes (e.g., bounding boxes 711, FIG. 7B) around the one or more identifiable objects.

The first vehicle detects (1406) a plurality of objects (e.g., objects 706 and 708 in FIG. 7B) on the road surface in the road image. In some embodiments, the first vehicle applies a generic obstacle detection model (e.g., generic obstacle detection model 230C, FIG. 8), distinct from the object detection model 230A, to detect the plurality of objects. In some embodiments, the plurality of objects includes (1408) a first generic obstacle, and the first vehicle includes a lane detection model (e.g., machine learning models 250, FIG. 2). The first vehicle applies the lane detection model to detect an ego lane, along which the first vehicle is travelling, and a neighboring lane on the road image. The first vehicle determines (1410) whether the first generic obstacle lies within the ego lane or the neighboring lane.

The first vehicle eliminates (1412) the one or more identifiable objects from the plurality of objects in the road image to determine one or more unidentifiable objects (e.g., box 708 in FIGS. 7A-7D, unidentifiable object 1306 in FIG. 13B) on the road surface in the road image. In some embodiments, each of the one or more identifiable objects and the one or more unidentifiable objects at least partially overlaps the road surface in the road image. In some embodiments, the first vehicle eliminates the one or more identifiable objects from the plurality of objects by overlaying the one or more bounding boxes over the plurality of objects detected in the road image and filtering out one or more regions corresponding to an intersection (e.g., overlap) between the one or more bounding boxes and the plurality of objects, thereby identifying the one or more unidentifiable objects on the road surface in the road image, e.g., in FIGS. 7C and 7D.

In some embodiments, eliminating the one or more identifiable objects from the plurality of objects includes comparing the one or more identifiable objects and the plurality of objects to filter out the one or more identifiable objects from the plurality of objects, identifying the one or more unidentifiable objects on the road surface in the road image, e.g., in FIG. 13B.

The first vehicle at least partially autonomously drives (1414) the first vehicle by treating the one or more unidentifiable objects differently from the one or more identifiable objects. For example, in some embodiments, in accordance with a determination that the one or more unidentifiable objects are present within a predetermined distance from the first vehicle, the first vehicle controls itself to drive according to a first trajectory (e.g., at a first velocity, a first acceleration, on the same lane, moving to a different lane, etc.) in response to a presence of the one or more unidentifiable objects. In some embodiments, in accordance with a determination that no unidentifiable object and at least a first identifiable object is present within the predetermined distance from the first vehicle, the first vehicle controls itself to drive according to a second trajectory (e.g., at a second velocity, a second acceleration, on the same lane, moving to a different lane, etc.) in response to a presence of the first identifiable object, the second trajectory being distinct from the first trajectory. In some embodiments, in accordance with a determination that no identifiable or unidentifiable object is present within the predetermined distance from the first vehicle, the first vehicle controls itself to drive according to a third trajectory (e.g., at a third velocity, a third acceleration, on the same lane, moving to a different lane, etc.), wherein the first, second, and third trajectories are distinct from one another.

In some embodiments, the method 1400 includes retraining (1416), using machine learning (e.g., retraining process 804), a drivable area model (e.g., drivable area model 230B, FIG. 8) using a corpus of training images 806 to generate a generic obstacle detection model (e.g., generic obstacle detection model 230C). The drivable area model is configured to detect a drivable area within road images. In some embodiments, the drivable area model is configured to predict a drivable area category and a background category. In some embodiments, the generic obstacle detection model is configured to predict a drivable area category, a background category, and a generic obstacle category.

In some embodiments, retraining the drivable area model using the corpus of training images to generate the generic obstacle detection model includes adding (1418) an extra model output to the drivable area model to generate the generic obstacle detection model including the extra model output. The extra model output of the generic obstacle detection model indicates a generic obstacle category.

In some embodiments, the method 1400 includes distributing (1420) the generic obstacle detection model to one or more vehicles, including the first vehicle, wherein, in use, the generic obstacle detection model is applied to detect the plurality of objects on the road surface in the road image.

In some embodiments, the method 1400 includes generating the corpus of training images, as described with respect to FIGS. 9, 10A, 10B, 11, and 12. In some embodiments, generating the corpus of training images includes obtaining a first set of images. Each image of the first set of images includes a respective road having a respective unoccluded road surface (e.g., without any identifiable obstacles). FIGS. 10A and 10B are two example road images 1002 and 1006 each having a respective unoccluded road surface 1004 and 1008. In some embodiments, the first set of images are obtained from a plurality of road images that each includes a respective road, and using (e.g., applying) an object detection model 230A to identify, from the plurality of road images, the first set of images including respective unoccluded road surfaces.

In some embodiments, the generating includes placing, in each image of the first set of images, one or more respective obstacle images (e.g., obstacle images 1112 in FIG. 11) onto the respective unoccluded road surface of the image to create a plurality of synthetic training images (e.g., synthetic training images 1202 in FIG. 12), and adding the plurality of synthetic training images to the corpus of training images 806. In some embodiments, the one or more respective obstacle images are extracted from the plurality of road images using one or more segmentation masks. In some embodiments, each of the one or more respective obstacle images has a respective contour that completely lies within a drivable area of the respective unconcluded road surface of the road image.

In some embodiments, the method 1400 includes enabling labeling of the plurality of synthetic training images to generate a plurality of labeled training images. In some embodiments, this process creates perfect labels are created because the (e.g., exact) position at which a respective obstacle image is placed onto a respective unconcluded road surface is known.

In one or more examples, the functions described may be implemented in hardware, software, firmware, or any combination thereof. If implemented in software, the functions may be stored on or transmitted over, as one or more instructions or code, a computer-readable storage medium and executed by a hardware-based processing unit. Computer-readable media may include computer-readable storage media, which corresponds to a tangible medium such as data storage media, or communication media including any medium that facilitates transfer of a computer program from one place to another (e.g., according to a communication protocol). In this manner, computer-readable media generally may correspond to (1) tangible computer-readable storage media which is non-transitory or (2) a communication medium, such as a signal or carrier wave. Data storage media may be any available media that can be accessed by one or more computers or one or more processors to retrieve instructions, code and/or data structures for implementation of the embodiments described in the present application. A computer program product may include a computer-readable storage medium.

The terminology used in the description of the embodiments herein is for the purpose of describing particular embodiments only and is not intended to limit the scope of claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first and second may be used herein to describe various elements, these elements should not be limited by these terms. These terms are only used to distinguish one element from another. For example, a first vehicle could be termed a second vehicle, and, similarly, a second vehicle could be termed a first vehicle, without departing from the scope of the embodiments. The first vehicle and the second vehicle are both vehicle, but they are not the same vehicle if not explained in some specific embodiments.

The description of the present application has been presented for purposes of illustration and description, and is not intended to be exhaustive or limited to the invention in the form disclosed. Many modifications, variations, and alternative embodiments will be apparent to those of ordinary skill in the art having the benefit of the teachings presented in the foregoing descriptions and the associated drawings. The embodiments are described in order to best explain the principles of the invention, the practical application, and to enable others skilled in the art to understand the invention for various embodiments and to utilize the underlying principles and various embodiments with various modifications as are suited to the particular use contemplated. Therefore, the scope of the claims is not to be limited to the specific examples of the embodiments disclosed. Modifications and other embodiments are intended to be included within the scope of the appended claims.

What is claimed is:

1. A method for generic obstacle detection, comprising:
   at a first vehicle including one or more processors and memory:
   obtaining a road image including a road surface along which the first vehicle is travelling;
   detecting a plurality of objects on the road surface in the road image;
   identifying, from the detected plurality of objects, one or more identifiable objects on the road surface in the road image, each of the one or more identifiable objects is associated with at least one predefined object class;
   eliminating the one or more identifiable objects from the plurality of objects in the road image to determine one or more unidentifiable objects on the road surface in the road image, each of the one or more unidentifiable objects is not associated with the at least one predefined object class; and
   at least partially autonomously driving the first vehicle in a first trajectory in response to a presence of the one or more unidentifiable objects and in a second trajectory in response to the one or more identifiable objects, wherein the first trajectory is different from the second trajectory.

2. The method of claim 1, wherein an object detection model is applied to identify the one or more identifiable objects and generate one or more bounding boxes around the one or more identifiable objects, and a generic obstacle detection model, distinct from the object detection model, is applied to detect the plurality of objects.

3. The method of claim 1, further comprising:
generating, for the road image, one or more bounding boxes, wherein each of the bounding boxes corresponds to a respective one of the identifiable objects in the road image.

4. The method of claim 3, wherein eliminating the one or more identifiable objects from the plurality of objects includes:
overlaying the one or more bounding boxes over the plurality of objects detected in the road image; and
filtering out one or more regions corresponding to an intersection between the one or more bounding boxes and the plurality of objects, thereby identifying the one or more unidentifiable objects on the road surface in the road image.

5. The method of claim 1, wherein eliminating the one or more identifiable objects from the plurality of objects includes:
comparing the one or more identifiable objects and the plurality of objects to filter out the one or more identifiable objects from the plurality of objects, thereby identifying the one or more unidentifiable objects on the road surface in the road image.

6. The method of claim 1, further comprising:
training, using machine learning via a corpus of training images, a drivable area model to generate a generic obstacle detection model, the drivable area model configured to detect a drivable area within road images and the generic obstacle detection model configured to detect a plurality of objects on road surfaces in the road images; and
distributing the generic obstacle detection model to one or more vehicles, including the first vehicle;
wherein the at least partially autonomously driving the first vehicle includes applying, by the first vehicle, the generic obstacle detection model to detect the plurality of objects on the road surface in the road image.

7. The method of claim 6, further comprising:
obtaining a first set of images, each of the first set of images including a respective unoccluded road surface; and
placing, in each image of the first set of images, one or more respective obstacle images onto the respective unoccluded road surface of the image to create a plurality of synthetic training images; and
adding the plurality of synthetic training images to the corpus of training images.

8. The method of claim 7, further comprising:
obtaining a plurality of road images, each of the road images including a respective road; and
using an object detection model to identify, from the plurality of road images, the first set of images including respective unoccluded road surfaces.

9. The method of claim 7, further comprising:
obtaining a plurality of road images, each of the road images including a respective road; and
using one or more segmentation masks to extract, from the plurality of road images, the one or more respective obstacle images.

10. The method of claim 7, wherein each of the one or more respective obstacle images has a respective contour that completely lies within a drivable area of the respective unoccluded road surface of the road image.

11. The method of claim 7, wherein the plurality of synthetic training images are manually or automatically labeled to generate a plurality of labeled training images.

12. The method of claim 6, wherein training the drivable area model to generate the generic obstacle detection model includes:
adding an extra model output to the drivable area model to generate the generic obstacle detection model including the extra model output, the extra model output of the generic obstacle detection model indicating a generic obstacle category.

13. The method of claim 12, wherein:
the drivable area model is a binary segmentation model configured to predict, from the road image, a drivable area category corresponding to a drivable area in the road image and a background category corresponding to one or more background areas complementary to the drivable area in the road image; and
the training includes configuring the generic obstacle detection model to predict, from the road image, a drivable area category corresponding to a drivable area in the road image, a background category corresponding to one or more background areas in the road image, and a generic obstacle category indicating an existence of one or more objects on the road surface in the road image, wherein the drivable area category, the background category and the generic obstacle category are mutually exclusive categories.

14. A first vehicle, comprising:
a plurality of sensors;
a vehicle control system;
one or more processors; and
memory storing one or more programs configured for execution by the one or more processors, the one or more programs comprising instructions for:
obtaining a road image including a road surface along which the first vehicle is travelling;
detecting a plurality of objects on the road surface in the road image;
identifying, from the detected plurality of objects, one or more identifiable objects on the road surface in the road image, each of the one or more identifiable objects is associated with at least one predefined object class;
eliminating the one or more identifiable objects from the plurality of objects in the road image to determine one or more unidentifiable objects on the road surface in the road image, each of the one or more unidentifiable objects is not associated with the at least one predefined object class; and
at least partially autonomously driving the first vehicle in a first trajectory in response to a presence of the one or more unidentifiable objects and in a second trajectory in response to the one or more identifiable objects, wherein the first trajectory is different from the second trajectory.

15. The first vehicle of claim 14, further comprising one or more cameras.

16. The first vehicle of claim 14, wherein the plurality of objects includes a first generic obstacle, and the first vehicle includes a lane detection model, the one or more programs comprising instructions for:
applying the lane detection model to detect an ego lane, along which the first vehicle is travelling, and a neighboring lane on the road image; and
determining whether the first generic obstacle lies within the ego lane or the neighboring lane.

17. A non-transitory computer-readable storage medium storing one or more programs configured for execution by one or more processors of a first vehicle, the first vehicle further including a plurality of sensors and a vehicle control system, the one or more programs comprising instructions for:

obtaining a road image including a road surface along which the first vehicle is travelling;

detecting a plurality of objects on the road surface in the road image;

identifying, from the detected plurality of objects, one or more identifiable objects on the road surface in the road image, each of the one or more identifiable objects is associated with at least one predefined object class;

eliminating the one or more identifiable objects from the plurality of objects in the road image to determine one or more unidentifiable objects on the road surface in the road image, each of the one or more unidentifiable objects is not associated with the at least one predefined object class; and at least partially autonomously driving the first vehicle in a first trajectory in response to a presence of the one or more unidentifiable objects and in a second trajectory in response to the one or more identifiable objects, wherein the first trajectory is different from the second trajectory.

18. The non-transitory computer-readable storage medium of claim 17, wherein each of the one or more identifiable objects and the one or more unidentifiable objects at least partially overlaps the road surface in the road image.

19. The non-transitory computer-readable storage medium of claim 17, at least partially autonomously driving the first vehicle further comprising:

determining whether the one or more unidentifiable objects are present within a predetermined distance from the first vehicle;

in accordance with a determination that the one or more unidentifiable objects are present within a predetermined distance from the first vehicle, controlling the first vehicle to drive according to the first trajectory in response to the presence of the one or more unidentifiable objects; and in accordance with a determination that no unidentifiable object and at least a first identifiable object is present within the predetermined distance from the first vehicle, controlling the first vehicle to drive according to the second trajectory in response to a presence of the first identifiable object.

20. The non-transitory computer-readable storage medium of claim 19, at least partially autonomously driving the first vehicle further comprising:

determining whether an identifiable or unidentifiable object is present within the predetermined distance from the first vehicle; and in accordance with a determination that no identifiable or unidentifiable object is present within the predetermined distance from the first vehicle, controlling the first vehicle to drive according to a third trajectory, wherein the first trajectory, the second trajectory, and the third trajectory are distinct from one another.

* * * * *